(12) United States Patent
Upadhyay

(10) Patent No.: US 11,074,533 B1
(45) Date of Patent: Jul. 27, 2021

(54) SYSTEM AND METHOD FOR CREATING AN OPTIMIZED ACTIONABLE INTERFACE FOR DATA ACCESS AND VISUALIZATION

(71) Applicant: Cognizant Technology Solutions India Pvt. Ltd., Chennai (IN)

(72) Inventor: Sandeep Upadhyay, Buffalo Grove, IL (US)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 0 days.

(21) Appl. No.: 17/067,862

(22) Filed: Oct. 12, 2020

(51) Int. Cl.
*G06F 3/0486* (2013.01)
*G06Q 10/06* (2012.01)
*G06N 5/02* (2006.01)
*G06F 3/0483* (2013.01)
*G06F 3/0484* (2013.01)
*G06F 3/0481* (2013.01)

(52) U.S. Cl.
CPC ..... *G06Q 10/06375* (2013.01); *G06F 3/0483* (2013.01); *G06F 3/0486* (2013.01); *G06F 3/04817* (2013.01); *G06F 3/04847* (2013.01); *G06N 5/02* (2013.01); *G06Q 10/06393* (2013.01)

(58) Field of Classification Search
CPC ........ G06Q 10/06375; G06Q 10/06393; G06F 3/0486; G06F 3/04847; G06F 3/04817; G06F 3/0483; G06F 3/048; G06N 5/02
See application file for complete search history.

(56) References Cited

U.S. PATENT DOCUMENTS

| | | | |
|---|---|---|---|
| 8,935,277 B2 | 1/2015 | Kuchmann-Beauger | |
| 9,092,510 B1* | 7/2015 | Stets, Jr. | G06F 16/3326 |
| 10,896,480 B1* | 1/2021 | Abou-Nassif | G06F 9/4881 |
| 2016/0205697 A1* | 7/2016 | Tan | H04W 24/02 370/329 |
| 2017/0287090 A1 | 10/2017 | Hunn | |
| 2018/0330299 A1* | 11/2018 | Chen | G06Q 10/06393 |
| 2019/0096017 A1* | 3/2019 | Whitley | G06Q 10/06395 |
| 2020/0143348 A1 | 5/2020 | Collares | |
| 2021/0019338 A1* | 1/2021 | Grampurohit | G06F 3/0481 |

* cited by examiner

*Primary Examiner* — Jeanette J Parker
(74) *Attorney, Agent, or Firm* — Cantor Colburn LLP

(57) ABSTRACT

A system and a method for creating an optimized actionable interface for data access and visualization is provided. Different types of metrics and Key Performance Indicators (KPIs) data associated with enterprise data is analyzed for determining one or more key metrics and KPIs data and identifying a causal attribution data between the key metrics and KPIs data for determining effect of change of one key metric and KPI data on another key metric and KPI data. Further, one or more widgets are generated based on the analyzed metrics and KPIs data. Further, a unified user interface (UI) is generated for visualization of the widgets. Lastly, an end-user activity on the unified UI is tracked based on one or more tags embedded in the unified UI. The tags capture the end-user clicks and actions on the unified UI.

25 Claims, 18 Drawing Sheets

New Horizons
Insights Platform

Company View | My Horizons | Headlines | Process Flows

Popular Insights Subscribed by Your Division

Popular Insights Subscribed by Your Team

My Subscribed Insights

FIG. 12

SYSTEM AND METHOD FOR CREATING AN OPTIMIZED ACTIONABLE INTERFACE FOR DATA ACCESS AND VISUALIZATION

FIELD OF THE INVENTION

The present invention relates generally to the field of data analytics and more particularly, the present invention relates to a system and a method for creating an optimized actionable interface for data access and visualization.

BACKGROUND OF THE INVENTION

Various enterprises, around the world, utilizes and consumes large amounts of data for at least extracting, processing, organizing, analyzing, displaying and visualizing the data. Data utilized by the enterprise is associated with various metrics and key performance indicators (KPIs), which are consumed in the form of reports and dashboards, and are generated and maintained by data analysts and data scientists using various business intelligence (BI) and visualization tools and technologies.

It has been observed that, existing BI and visualization tools and technologies used for enterprise reports and dashboard generation and maintenance are inefficient, and incur huge costs with respect to infrastructure, development, licenses, supporting and maintaining the tools and technologies for enterprise reports and dashboard generation and implementation. Further, development and deployment of enterprise reports and dashboards by the existing tools and technologies are not time efficient. It has been observed that existing tools and technologies take around 12-52 weeks of time for development of enterprise reports and dashboards. Furthermore, existing BI tools and technologies are not able to effectively determine Return On Investment (ROI), as the reports and dashboards generated using the existing tools and techniques are cumbersome and obsolete.

With existing BI and visualization tools, it has also been observed that end-users are not able to adequately use enterprise reports and dashboards, for lack of personalized experience provided to end-users. It has been further observed that existing tools and technologies do not provide end-users with customizable reports and dashboards for specific metrics and KPIs according to their requirements and adoption and active usage usually drops to 10% to 15% around a twelve-month mark post launch. Further, various enterprises use different types of BI and visualization tools and technologies that generate inconsistent reports and dashboards for various metrics and KPIs. Further, existing BI and visualization tools and technologies are not able to efficiently accumulate and identify enterprise metric and KPI data, which is present in various external and internal systems, while generating a report and a dashboard according to end-user requirements. Furthermore, existing tools and technologies are not intelligent to recommend insights associated with end-user requirements while generating enterprise reports and dashboards and the enterprise reports and dashboards generated are not agile as it takes at least 3-8 weeks of time for modifying and making changes (e.g. adding or removing metrics, feature addition, etc.) to the existing enterprise reports and dashboards and are therefore static in nature.

Moreover, migration from one type of BI and visualization tool and technology to another is an expensive and laborious process, as it requires a lot of effort for redesigning, rebuilding and redeploying existing reports and dashboards and further training of end-users. Yet further, the enterprise reports and dashboards generated using existing BI and visualization tools and technologies lacks advanced prediction capabilities with respect to the happening of certain future events in the enterprise.

In light of the above drawbacks, there is a need for a system and a method which provides for creating an optimized actionable interface for data access and visualization. There is a need for a system and a method which provides for personalized, customizable and consistent data visualization according to end-user requirements. Further, there is a need for a system and a method which provides for intelligent recommendation of insights associated with end-user requirements for data visualization. Furthermore, there is a need for a system and a method which provides for agility and prediction capability to data visualization. Yet further, there is a need for a system and a method which provides for cost effective and time efficient development, generation and implementation of data visualization.

SUMMARY OF THE INVENTION

In various embodiments of the present invention, a system for creating an optimized actionable interface for data access and visualization is provided. The system comprises a memory storing program instructions, a processor executing program instructions stored in the memory and a visualization optimization engine executed by the processor. The visualization optimization engine is configured to analyze different types of metrics and Key Performance Indicators (KPIs) data associated with enterprise data for determining one or more key metrics and KPIs data and identifying a causal attribution data between the key metrics and KPIs data for determining effect of change of one key metric and KPI data on another key metric and KPI data. Further, one or more widgets are generated based on the analyzed metrics and KPIs data. The widgets represent recommendations of end-user specific metrics and KPIs data based on the end-user viewing patterns. Further, a unified user interface (UI) is generated for visualization of the widgets. The widgets are associated with metadata corresponding to the metrics and KPIs data. Lastly, an end-user activity on the unified UI is tracked based on one or more tags embedded in the unified UI. The tags capture the end-user clicks and actions on the unified UI.

In various embodiments of the present invention, a method for creating an optimized actionable interface for data access and visualization. The method is implemented by a processor executing instructions stored in a memory. The method comprises analyzing different types of metrics and Key Performance Indicators (KPIs) data associated with enterprise data for determining one or more key metrics and KPIs data and identifying a causal attribution data between the key metrics and KPIs data for determining effect of change of one key metric and KPI data on another key metric and KPI data. Further, generating one or more widgets based on the analyzed metrics and KPIs data. The widgets represent recommendations of end-user specific metrics and KPIs data based on the end-user viewing patterns. Further, generating a unified user interface (UI) for visualization of the widgets. The widgets are associated with metadata corresponding to the metrics and KPIs data. Lastly, tracking an end-user activity on the unified UI based on one or more tags embedded in the unified UI. The tags capture the end-user clicks and actions on the unified UI.

In various embodiments of the present invention, a computer program product is provided. The computer program product comprises a non-transitory computer-readable medium having computer-readable program code stored thereon, the computer-readable program code comprising instructions, that when executed by a processor, causes the processor to analyze different types of metrics and Key Performance Indicators (KPIs) data associated with enterprise data for determining one or more key metrics and KPIs data and identifying a causal attribution data between the key metrics and KPIs data for determining effect of change of one key metric and KPI data on another key metric and KPI data. Further, generate one or more widgets based on the analyzed metrics and KPIs data. The widgets represent recommendations of end-user specific metrics and KPIs data based on the end-user viewing patterns. Further, generate a unified user interface (UI) for visualization of the widgets. The widgets are associated with metadata corresponding to the metrics and KPIs data. Lastly, track an end-user activity on the unified UI based on one or more tags embedded in the unified UI. The tags capture the end-user clicks and actions on the unified UI.

BRIEF DESCRIPTION OF THE ACCOMPANYING DRAWINGS

The present invention is described byway of embodiments illustrated in the accompanying drawings wherein:

FIG. 12 is a screenshot of the unified UI illustrating one or more alerts to end-user in the form of headlines, in accordance with an embodiment of the present invention;

DETAILED DESCRIPTION OF THE INVENTION

The present invention discloses a system and a method for creating an optimized actionable interface for data access and visualization. In particular, the present invention provides for creating an actionable interface for optimized access and visualization of enterprise metrics and key performance indicators (KPIs) data via a unified user interface (UI). The unified UI comprises multiple insight widgets associated with enterprise metrics and KPIs data. The present invention provides for personalizing and customizing enterprise metrics and KPIs data access and visualization according to end-user requirements by providing capability of adding and removing the insight widgets. Further, the present invention provides for efficiently accumulating and identifying enterprise metric and KPI data for access and visualization according to end-user requirements. Furthermore, the present invention provides for intelligent recommendation of insights associated with the enterprise metrics and KPIs data for access based on tracking every click that end-user makes on the interface and understanding the end-user preferences and behavioral aspects. Yet further, the present invention provides for agility to access and visualization of enterprise metrics and KPIs data with advanced prediction capability.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
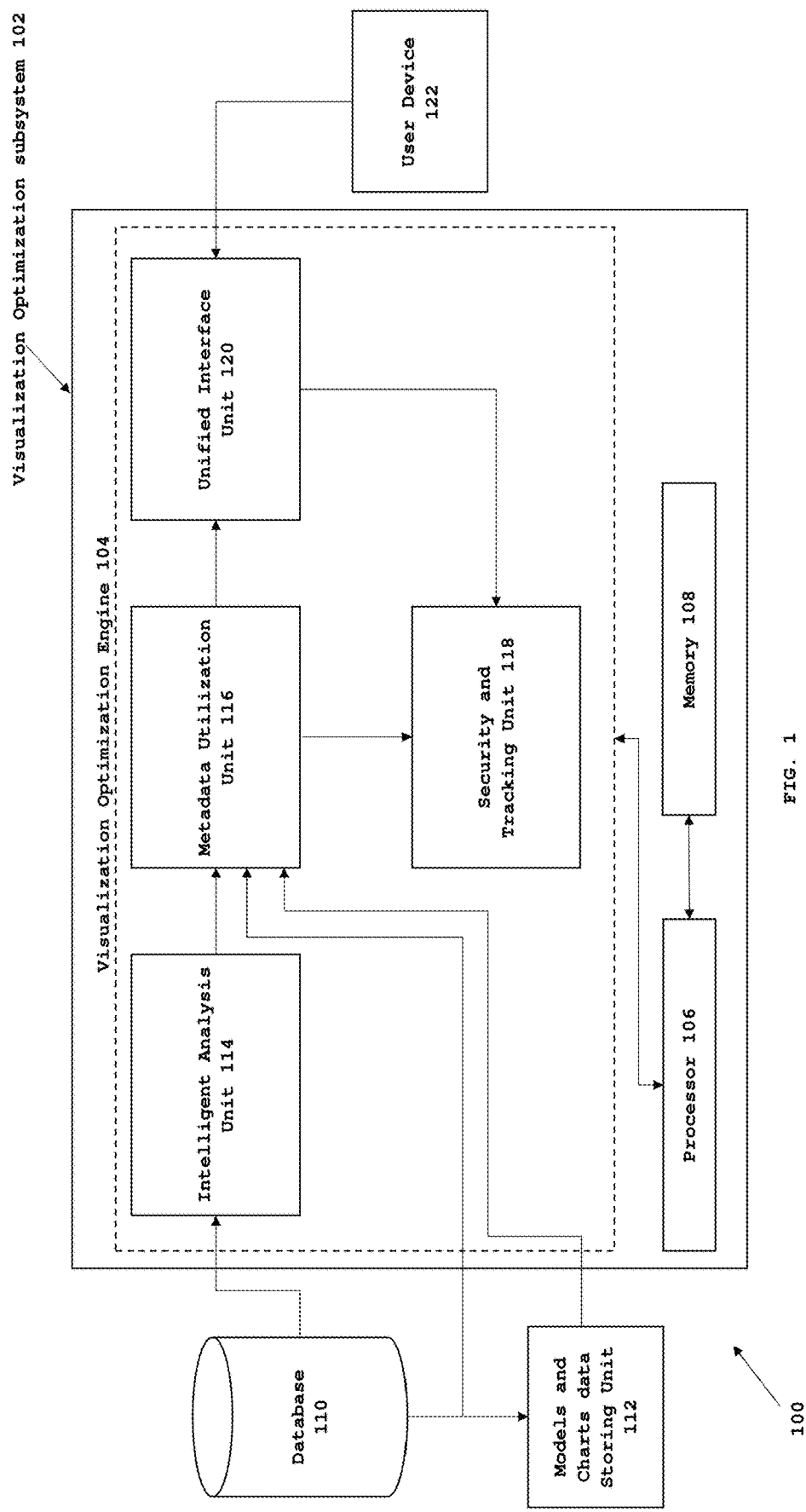
FIG. 1 is a block diagram of a system for creating an optimized actionable interface for data access and visualization, in accordance with an embodiment of the present invention.

FIG. 1 is a block diagram of a system 100 for creating an optimized actionable interface for data access and visualization, in accordance with various embodiments of the present invention. Referring to FIG. 1, in an embodiment of the present invention, the system 100 comprises a database 110, a models and charts data storing unit 112, a visualization optimization subsystem 102 (subsystem 102) and a user device 122.

In an embodiment of the present invention, the subsystem 102 may be implemented in a cloud computing architecture in which data, applications, services and other resources are stored and delivered through shared data-centers. In an exemplary embodiment of the present invention, the functionalities of the subsystem 102 are delivered to a user as software as a service (SaaS) over a communication network. The communication network may include, but is not limited to, a physical transmission medium, such as, a wire, or a logical connection over a multiplexed medium, such as, a radio channel in telecommunications and computer networking. The examples of radio channel in telecommunications and computer networking may include, but are not limited to, a local area network (LAN), a metropolitan area network (MAN) and a wide area network (WAN).

In another embodiment of the present invention, the subsystem 102 may be implemented as a client-server architecture. In said embodiment of the present invention, a client terminal accesses a server hosting the subsystem 102 over a communication network. The client terminals may include but are not limited to a smart phone, a computer, a tablet, microcomputer, a graphical user interface (GUI), an application programming interface (API) or any other wired or wireless terminal. The server may be a centralized or a decentralized server.

In an embodiment of the present invention, the subsystem 102 is a self-optimization and an intelligent system configured to create an optimized actionable interface for data access and visualization of enterprise data. The subsystem 102 is configured to fetch different types of data associated with one or more enterprises by connecting to the one or more databases 110 and the one or more models and charts data storing unit 112 respectively. The different types of data fetched is associated with one or more metrics and key performance indicators (KPIs) data of the enterprise. In an exemplary embodiment of the present invention, the subsystem 102 connects to the databases 110 and the models and charts data storing unit 112 via one or more business intelligence (BI) tools, one or more natural language processing (NLP) tools and one or more robotic automation tools. The business intelligence (BI) tools, the natural language processing (NLP) tools and the robotic automation tools fetches the different types of metrics and KPIs data associated with the enterprises from the databases 110 and the models and charts data storing unit 112, which is subsequently transmitted to the subsystem 102.

In an exemplary embodiment of the present invention, the different types of metrics and KPIs data fetched may include, but is not limited to, syndicated data, business intelligence (BI) models and charts data, non-syndicated data and data associated with various enterprise operational systems (not shown). The syndicated data and the business intelligence (BI) models and charts data is fetched from data warehouses, data marts, data lakes and data files associated with the database 110 and the models and charts data storing unit 112. The non-syndicated data is fetched from external and internal website systems and portals associated with the enterprise. In an exemplary embodiment of the present invention, the syndicated data and business intelligence (BI) models and charts data is fetched by the business intelligence (BI) tools and the natural language processing (NLP) tools as a Data as a Service (DaaS) over the communication network. In another exemplary embodiment of the present invention, the non-syndicated data and data from various enterprise operational systems (not shown) is fetched by the robotic automation tools as a Content as a Service (CaaS) over the communication network.

In another exemplary embodiment of the present invention, the syndicated data, business intelligence (BI) models and charts data, the non-syndicated data and the data from various enterprise operational systems (not shown) associated with the enterprise relates to a specific domain of the enterprise. The enterprise domain may include, but is not limited to, customer services, retail, marketing, entertainment and media, hospitality, food production, information technology, telecommunications, research and development, life sciences, healthcare, banking, finance and insurance. Further, if an enterprise relates to healthcare domain, then the metric and KPI data may include, but is not limited to, patient satisfaction data, patient safety data, hospital readmissions data, patient wait time data, etc.

In various embodiments of the present invention, the data, fetched by the business intelligence (BI) tools, the natural language processing (NLP) tools and the robotic automation tools is transmitted to the visualization optimization engine 102 as a Virtualization as a Service (VaaS) over the communication network using one or more Application Programming Interfaces (APIs) and dynamic visualization tools, which is provided to the end-user by the visualization optimization subsystem 102. In an embodiment of the present invention, the visualization optimization subsystem 102 comprises a visualization optimization engine 104, a processor 106 and a memory 108. In various embodiments of the present invention, the visualization optimization engine 104 comprises multiple units which operate in conjunction with each other for creating an optimized actionable interface for data access and visualization. The various units of the visualization optimization engine 104 are operated via the processor 106 specifically programmed to execute instructions stored in the memory 108 for executing respective functionality of the units of the engine 104, in accordance with various embodiments of the present invention.

In an embodiment of the present invention, the visualization optimization engine 104 (engine 104) comprises an intelligent analysis unit 114, a metadata utilization unit 116, a security and tracking unit 118 and a unified interface unit 120. The operation of the various units of the engine 104 has been explained in detail with respect to FIG. 2.

Figure 2:
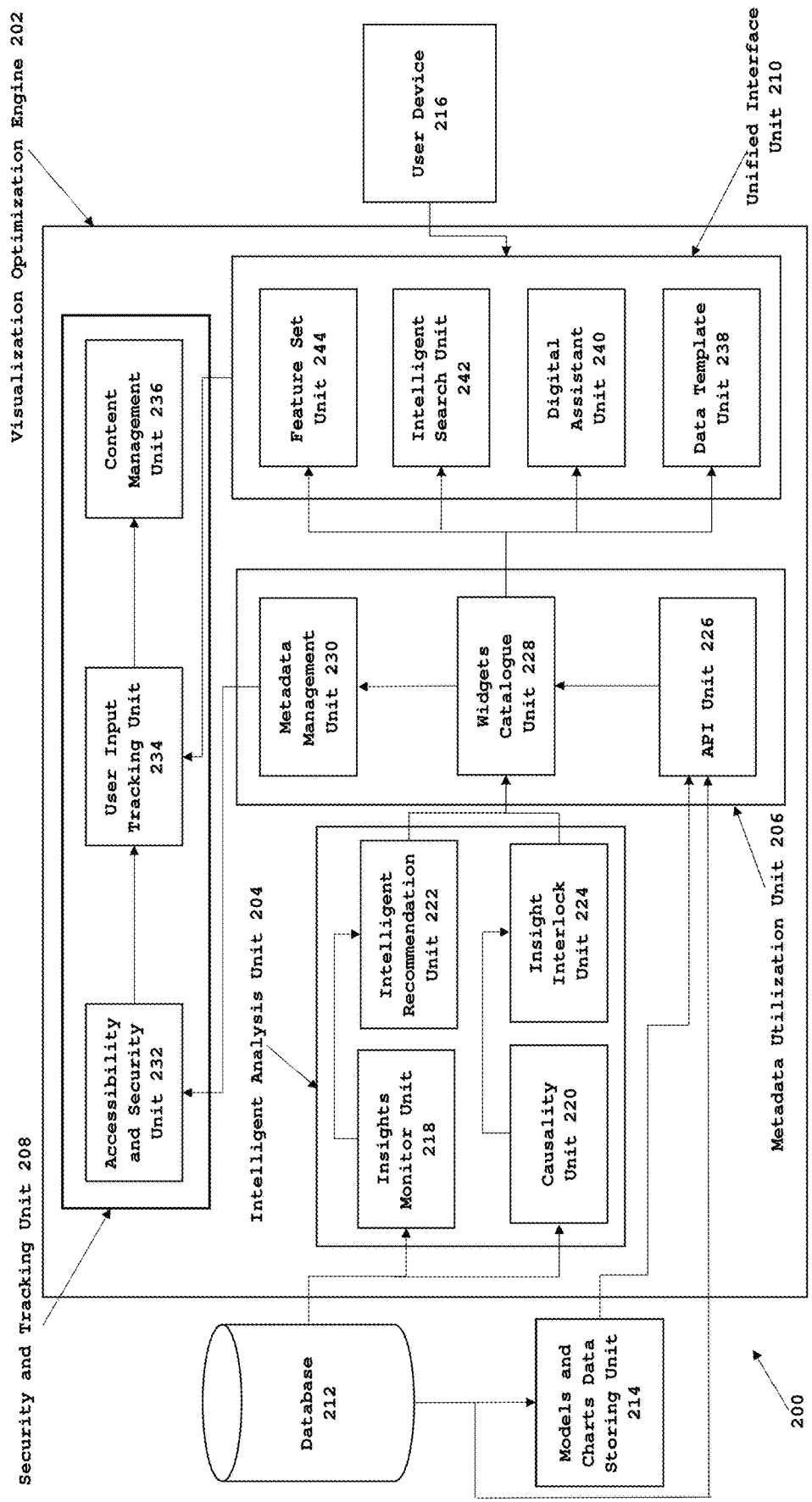
FIG. 2 is a detailed block diagram of a visualization optimization engine for creating an optimized actionable interface for data access and visualization, in accordance with an embodiment of the present invention.

FIG. 2 is a detailed block diagram of the engine 104 for creating an optimized actionable interface for data access and visualization, in accordance with various embodiments of the present invention.

In an embodiment of the present invention, the intelligent analysis unit 204 (114, FIG. 1) comprises an insights monitor unit 218, a causality unit 220, intelligent recommendation unit 222 and insight interlock unit 224. In an embodiment of the present invention, the metadata utilization unit 206 (116, FIG. 1) comprises an application programming interface (API) unit 226, a widgets catalogue unit 228 and a metadata management unit 230. In an embodiment of the present invention, the security and tracking unit 208 (118, FIG. 1) comprises an accessibility and security unit 232, a user input tracking unit 234 and a content management unit 236. In an embodiment of the present invention, the unified interface unit 210 (120, FIG. 1) comprises a data template unit 238, a digital assistant unit 240, an intelligent search unit 242 and a feature set unit 244.

In an embodiment of the present invention, the different types of metrics and KPIs data fetched from the database 212 (110, FIG. 1) is transmitted simultaneously to the insights monitor unit 218 and the causality unit 220 of the intelligent analysis unit 204. In an exemplary embodiment of the present invention, the insights monitor unit 218 is built based on one or more custom and process management tools such as, but are not limited to, commercial-off-the-shelf (COTS) applications tool and PEGA tool. In another exemplary embodiment of the present invention, the causality unit 220 is built based on one or more custom and process management tools such as, but are not limited to, COTS integration compellon tool.

In an embodiment of the present invention, the insights monitor unit 218 is configured to analyze the different types of metrics and KPIs data received from the database 212. For example, the database 212 may comprise customer sales data which may include metrics and KPIs data associated with, but are not limited to, product purchased, geography and time of sale. The insights monitor unit 218 analyzes the metrics and KPIs data for determining modifications and changes in the metrics and KPIs data that may have been carried out at the enterprise end. Modifications in KPIs and metrics are identified based on a rule based technique, outlier (trend break), threshold, pattern (e.g. occurrence), machine learning based dynamic thresholds or any AI driven threshold techniques. In an embodiment of the present invention, the metrics and KPIs data are analyzed for determining one or more signals associated with the modifications and changes in the metrics and KPIs data. Further, one or more pre-defined rules are applied to measure strength and consistency of the associated signals. The insights monitor unit 218 is configured to detect signals that change with respect to metrics and KPIs data. The changes in generated signals are determined for further efficiently informing the end-user on potential changes to the business processes being measured. Further, each signal is associated with a trigger, which is prioritized for activation based on a number of generated triggers. In an embodiment of the present invention, each trigger has one or more actions associated with it and a corresponding action associated with the trigger is executed based on the activated trigger. Further, the end-user may subscribe to be alerted, if the market share declines consecutively for three weeks. Consequently, if the market share declines, a signal is generated and a trigger associated with the signal may be generated, if market share declines for three consecutive weeks. Further, the insights monitor unit 218 may include one or more rules for executing an action associated with the trigger, which may include, but is not limited to, sending an alert notification to the end-user via an email.

In an embodiment of the present invention, the causality unit 220 is configured to analyze the different types of metrics and KPIs data received from the database 212 for identifying one or more key metrics and KPIs data that have a causal relationship with a desired outcome, which is represented by causal attribution data. In an exemplary embodiment of the present invention, techniques such as functional point analysis, causality & correlation, and mutual information theory etc. may be used to identify the causal attribution data. In an example, if the end outcome is to improve national product market share by 10% percent, causality analysis includes analyzing all relevant variables pertaining to sales, marketing, product support, customer complaints and feedback, brand perception etc. and identify the specific variables which, when acted upon would result in achieving the desired outcome. Further, the database 212 may comprise one or more key metrics and KPIs data associated with sales, such as, but are not limited to, product type data, promotional efforts data, customer perception surveys data, customer complaints data and product quality data. The key metrics and KPIs data associated with sales may further have a causal relationship with a desired outcome of promotional efforts and customer perception which is represented by the causal attribution data. In an embodiment of the present invention, the causality unit 220 is configured to identify causal attribution data between the key metrics and KPIs data and further determine one or more causal parameters for the key metrics or KPI data. In an embodiment of the present invention, output of the causality unit 220 is in the form of an attribution tree that provides an effect of change of one key metrics and KPIs data on another key metrics and KPIs data, in isolation as well in conjunction.

In an embodiment of the present invention, the determined modifications and changes in the different types of metrics and KPIs data and signals from the insights monitor unit 218 is transmitted to the intelligent recommendation unit 222. In an exemplary embodiment of the present invention, the intelligent recommendation unit 222 is built based on the one or more custom and process management tools such as, but are not limited to, commercial-off-the-shelf (COTS) applications such as, but are not limited to, PEGA tool, customer decision hub tool and InRule or Drools. The intelligent recommendation unit 222 is configured to analyze modifications of the metrics and KPIs data and signals for generating recommendations of end-user specific metrics and KPIs data in the form of one or more widgets for access and visualization of the metrics and KPIs data by the end-user. In an exemplary embodiment of the present invention, the recommendations may include, but are not limited to, most viewed metrics and KPIs data widgets, relevant metrics and KPIs data widgets, new metrics and KPIs data widgets based on the end-user viewing preference and metrics and KPIs data widgets that the end-user may view based on the day and month or an event. For example, if the end-user is associated with marketing functions and one or more of the end-users regularly view five specific widgets associated with the metrics and KPIs data, then the intelligent recommendation unit 222 recommends the most viewed widgets to the end-user. Further, if there is a pattern in the sequence of viewing of widgets by the end users, such as, firstly, viewing market share widget; secondly, viewing product promotion widget; thirdly, viewing customer complaints widget; and lastly, viewing produce perception widget, then the intelligent recommendation unit 222 recommends the end-user the widgets viewed in the pattern. Further, the recommendations are made based on analyzing end-user viewing patterns.

In an embodiment of the present invention, the identified causal attribution data between the key metrics and KPIs data from the causality unit 220 is transmitted to the insight interlock unit 224. In an exemplary embodiment of the present invention, the insight interlock unit 224 is built based on the one or more custom and process management tools such as, but are not limited to, COTS integration compellon tool. The insight interlock unit 224 is configured to further analyze the causal attribution data between the key metrics and KPIs data for determining causal insights data associated with the key metrics and KPIs data in the form of the one or more widgets. The causal insights data relates to a causal relationship between the metrics and KPIs data, providing the effect of change of one key metric and KPI data on the another key metric and KPI data and vice versa, which is viewed by the end-user in the form of the one or more widgets. For example, product sales data may have a causal relationship with production promotion data and customer complaints data. Further, customer complaints data may have a causal relationship with product quality. In the event, the end-user views a widget comprising the product sales, then the insight interlock unit 224 causes the end-users to visualize the effect of metrics and KPIs data on the product sales data such as, the product promotion data, the customer complaints data and the product quality data. Therefore, if product complaints are increasing and in the event it is determined that the product complaints have a causal relationship with product market share, the end-user may visualize the impact of increasing product complaints, i.e. decreasing of product market share.

In an embodiment of the present invention, the API unit 226 of the metadata utilization unit 206 is configured to receive the metrics and KPIs data from the database 212 (110, FIG. 1) and the models and charts data storing unit 214 (112, FIG. 1). In an exemplary embodiment of the present invention, the API unit 226 is built based on one or more custom APIs such as, but are not limited to, representational state transfer (REST) API. The API unit 226 has in-built one or more sets of APIs. The API unit 226 is configured to process the data received from the database 212 and the models and charts data storing unit 214 for converting the data into a suitable format for enabling visualization of the said data to the end-user via the unified interface unit 210 on the user device 216 associated with the end-user. Further, the API unit 226 is configured to transmit the processed data to the widgets catalogue unit 228, which tags the processed data with the metadata before being transmitted to the end-user via the unified interface unit 210 for data access and visualization. In an example, access to the syndicated data, business intelligence (BI) models and charts data, the non-syndicated data and the data from various enterprise operational systems (not shown) is provided to the end-user on the user device 216 via the unified interface unit 210 which is the optimized actionable interface.

In an embodiment of the present invention, the determined modifications in the metrics and KPIs data from the intelligent recommendation unit 222 and the determined causal insights data from the insight interlock unit 224 is transmitted to the widgets catalogue unit 228 of the metadata utilization unit 206. In an exemplary embodiment of the present invention, the widgets catalogue unit 228 is built based on one or more custom web applications such as, but are not limited to, HTML5, Angular and MySQL. The widgets catalogue unit 228 is configured to tag the received metrics and KPIs data with metadata associated with the metrics and KPI data. Further, the widgets catalogue unit 228 is configured to catalogue the metadata tagged metrics and KPIs data in the form of one or more metrics and KPIs data widgets. The catalogued widgets are further provided by the widgets catalogue unit 228 for enabling intelligent search by the intelligent search unit 242 of the unified interface unit 210. In an exemplary embodiment of the present invention, the metadata tagged metrics and KPIs data catalogued in the widgets catalogue unit 228 may include, but is not limited to, widget title, metrics and KPI's data, product name data, data quality status, published date and refreshed date.

In an embodiment of the present invention, the widgets catalogue unit 228, subsequent to tagging the data received from the intelligent recommendation unit 222 and the insight interlock unit 224 with the metadata and further tagging the data received from the API unit 226 with the metadata, is configured to connect to the metadata management unit 230. In an exemplary embodiment of the present invention, the metadata management unit 230 is built based on the one or more custom web applications such as, but are not limited to, HTML5, Angular and MySQL. The metadata management unit 230 is configured to manage, maintain and store the metadata tagged by the widgets catalogue unit 228. In an embodiment of the present invention, the metadata management unit 230 stores the tagged metadata in one or more structured application management tables in a database (not shown) associated with the metadata management unit 230. In an exemplary embodiments of the present invention, the structured application management tables comprises the metadata information such as, but is not limited to, a widget composition summary, a widget metadata summary, a widget connection settings, end-user type, end-user hierarchy and widget security. The metadata management unit 230 further stores one or more operational characteristics of one or more custom web applications in the database (not shown) such as, but are not limited to, access, security and data visibility.

Figure 3:
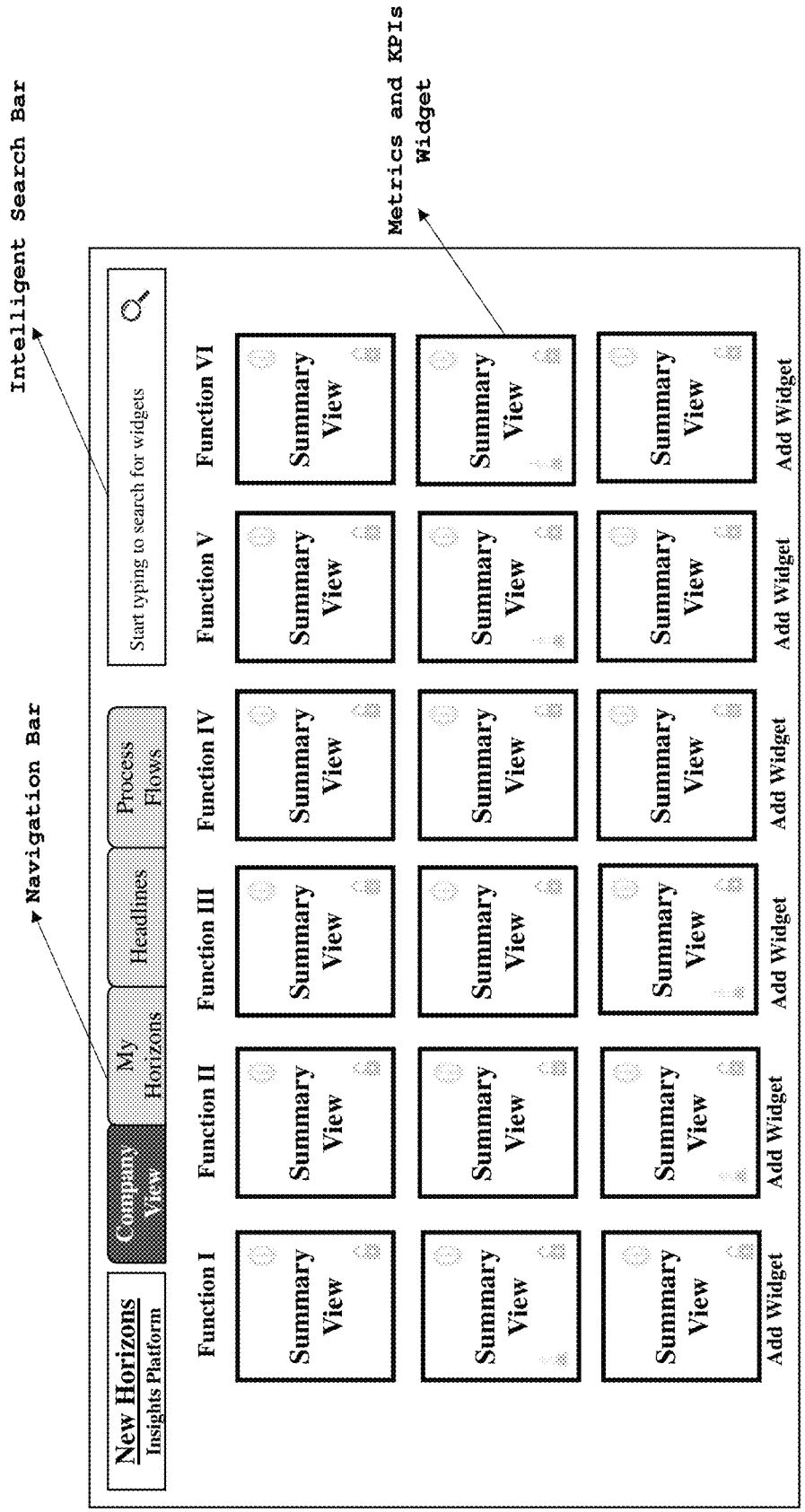
FIG. 3 is a screenshot of a unified user interface (UI) which is an optimized actionable interface, in accordance with an embodiment of the present invention.

In an embodiment of the present invention, the widgets catalogue unit 228 of the metadata utilization unit 206 is configured to connect to the data template unit 238, the digital assistant unit 240, the intelligent search unit 242 and the feature set unit 244 of the unified interface unit 210. The widgets catalogue unit 228 provides data received from the intelligent recommendation unit 222 and the insight interlock unit 224 subsequent to tagging with the metadata and further the data received from the API unit 226 subsequent to tagging with metadata, to the end-users on the user device 216 via the said units of the unified interface unit 210. In an exemplary embodiment of the present invention, the unified interface unit 210 is built based on the one or more custom web applications such as, but are not limited to, HTML5, Angular and MySQL. The unified interface unit 210 is an actionable interface which is accessed by the end-users via the user device 216 for visualizing enterprise metrics and KPIs data received by the insights monitor unit 218 and the causality unit 220 of the intelligent analysis unit 204 and the API unit 226 of the metadata utilization unit 206 from the database 212 and the models and chart storing data unit 214. The data template unit 238, the digital assistant unit 240, the intelligent search unit 242 and the feature set unit 244 of the unified interface unit 210 operates in conjunction with each other for providing the optimized visualization of metrics and KPIs data by generating a unified user interface (UI), as illustrated in FIG. 3. The unified UI provided to the end-user is a dynamic actionable user interface.

In an exemplary embodiment of the present invention, referring to FIG. 3, the unified UI comprises a navigation bar at the top. The navigation bar comprises at least, company view tab, my horizons tab, headlines tab and process flow tab. Further, the unified UI comprises an intelligent search bar for carrying out predictive search. Yet further, the unified UI comprises the widgets associated with the enterprise metrics and KPIs data. The widgets may be added or removed on the unified UI by the end-users based on their requirements. The widgets are in the form of a card of at least square shape and rectangular shape and have metadata corresponding to the metrics and KPIs data associated with it.

Figure 4:
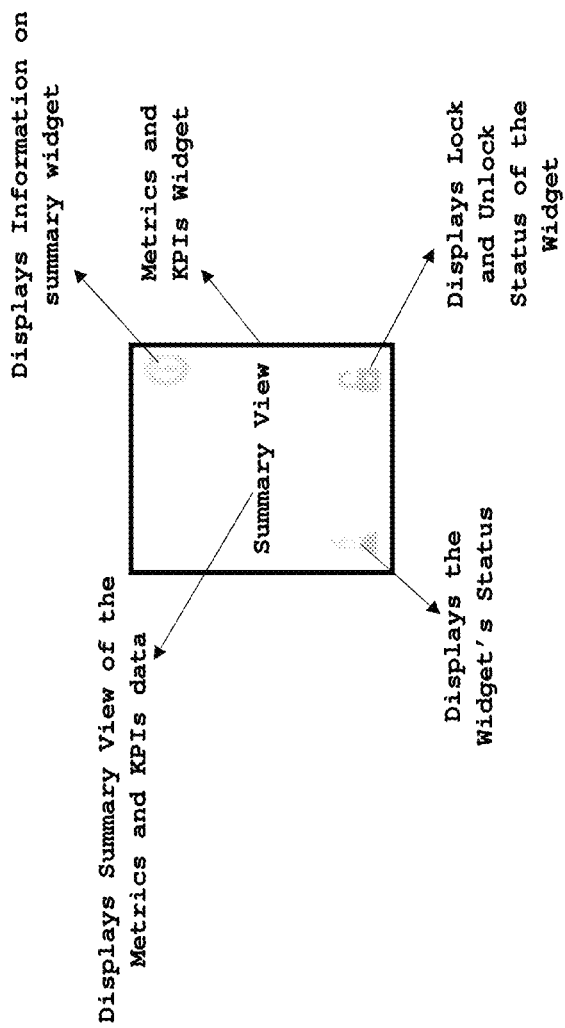
FIG. 4 illustrates a detailed view of a widget associated with enterprise metrics and key performance indicators (KPIs) data, in accordance with an embodiment of the present invention.

In an exemplary embodiment of the present invention, referring to FIG. 4, the widgets are configured to provide one or more metrics and KPIs data of an enterprise in a summary view. The summary view provides a visual cue for comparison against a benchmark metrics. The visual cue may includes, but is not limited to, a traffic light (green, red, yellow), arrows (up and down) and embedded mini charts (e.g. bar charts). The widgets associated with the enterprise metrics and KPIs data may be organized, analyzed and visualized by the end-user. Further, the widgets provide information such as, but is not limited to, metric and KPIs definition data, enterprise end-users, data quality status and refresh frequency data. The one or more widgets are configured to be locked for fixing them on the unified UI or unlocked for removing them from the unified UI. Further, the widgets provide information whether the metrics and KPIs data has been validated and tested. In an exemplary embodiment of the present invention, testing is carried out to determine whether a) the underlying data used to compute the metric has been certified as accurate, b) the process to compute the metric has been applied consistently and correctly and c) the metric has been reviewed and validated as accurate. Therefore, the validation and testing of metrics and KPIs data includes, but is not limited to, confirming whether the process to compute the metrics and KPIs data has been carried out based on one or more pre-defined guidelines and rules, the data used for computation is error free in order to protect the metrics and KPIs data from getting skewed and the metrics and KPIs data displayed in the widget is similar to the computed metrics and KPIs data and is stored in the database 212.

Figure 5:
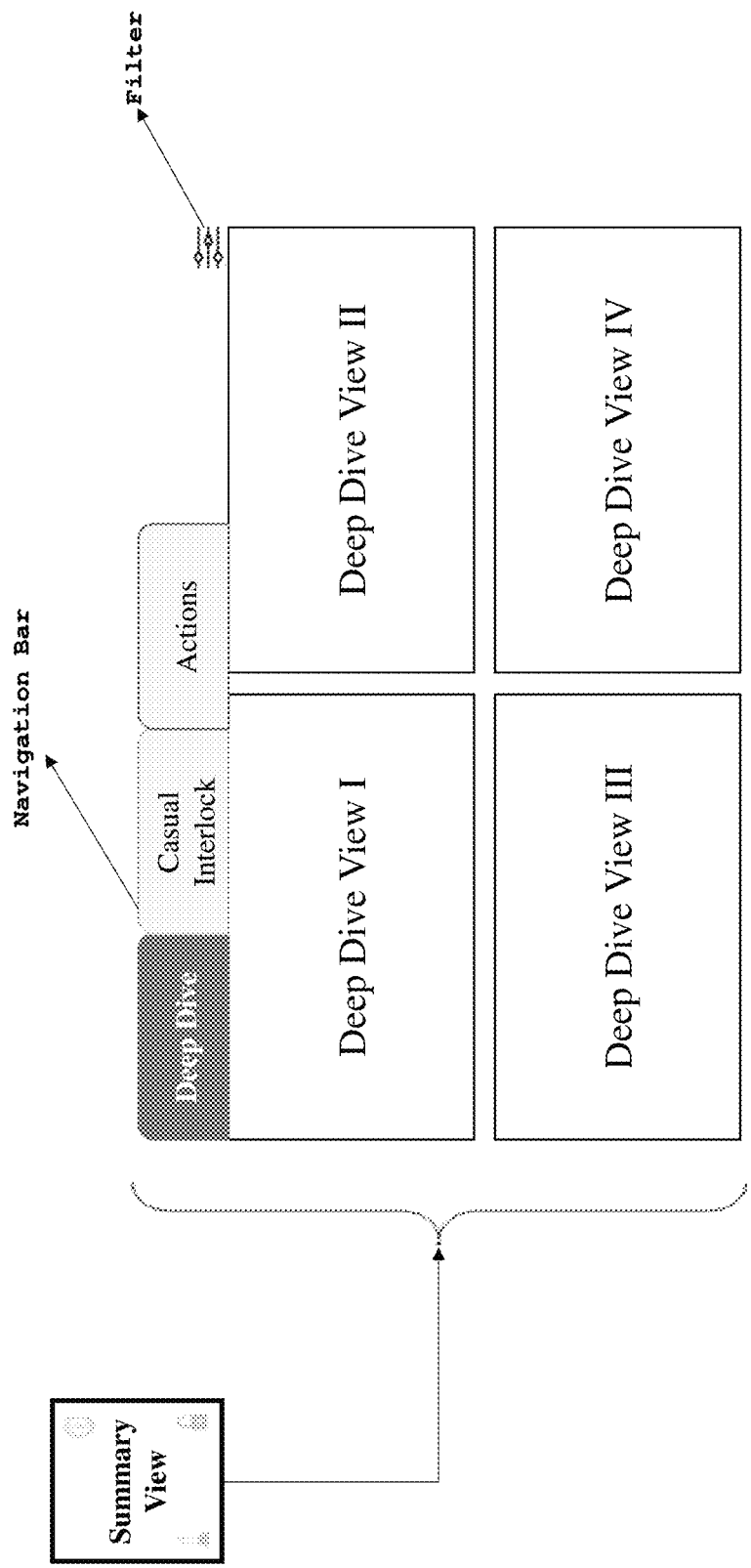
FIG. 5 illustrates a first expanded view of the widget associated with the enterprise metrics and key performance indicators (KPIs) data, in accordance with an embodiment of the present invention.

In another exemplary embodiment of the present invention, referring to FIG. 5, the one or more widgets are further configured to provide a first expanded view of the summary view. The first expanded view of the widgets provide at least an elaborated view of the summary view referred to as a deep drive view. The first expanded view provides data associated with the metrics and KPIs data in a grid of dimension m×n (e.g. 2×2 grid). For example, if the metrics and KPIs relate to sales of an enterprise, the 2×2 grid of the expanded view may provide at least data related to, sales by region, sales by product, sales by demand, sales by cost of the product, etc. Further, the metrics and KPIs data in the first expanded view is capable of being filtered according to the needs and requirements of the end-user. For example, the end-user may want to view only productions data or costs data, which he may filter accordingly.

Figure 6:
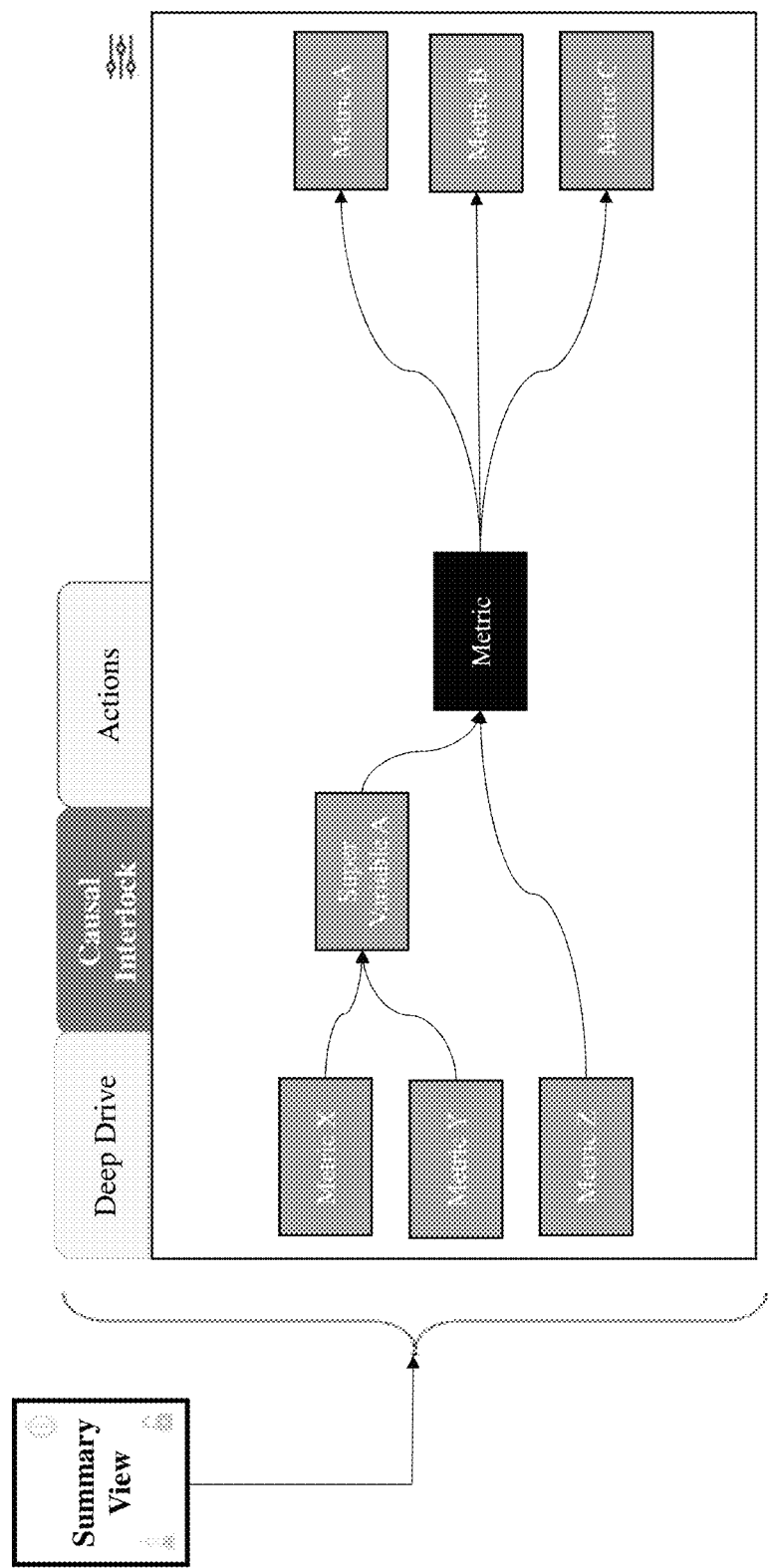
FIG. 6 illustrates a second expanded view of the widget associated with the enterprise metrics and key performance indicators (KPIs) data, in accordance with an embodiment of the present invention.

Referring to FIG. 6, a second expanded view of the widgets is provided. In another exemplary embodiment of the present invention, the one or more widgets are further configured to provide a second expanded view of the summary view. The second expanded view of the widgets provide causal insights data referred to as causal interlock data comprising at least cause of change in a particular metrics and KPIs data and effect of the said change of the particular metrics and KPIs data on the other metrics and KPIs data and super variables data associated with the enterprise and vice versa. The super variables data relates to the compounded effect of variables in conjunction with each other. As illustrated in FIG. 6, change of the metrics X and Y may have a compounded effect, referred as a super variable A, on a particular metric and a metric Z has a direct effect on that particular metric. Further, change in that particular effected metric may further effect metrics A, B and C. The causal analysis is carried out by the causality unit 220 of the intelligent analysis unit 204, as aforementioned. For example, if the sales of a particular product of an enterprise decreases, then it may effect the other metrics and KPIs data such as the bonus, increments, investments etc. The causality unit 220 further provides one or more variables that may predict the outcome of the metrics and KPIs data viewed and measures a compounded effect in conjunction with each other (referred as the super variables).

Figure 7:
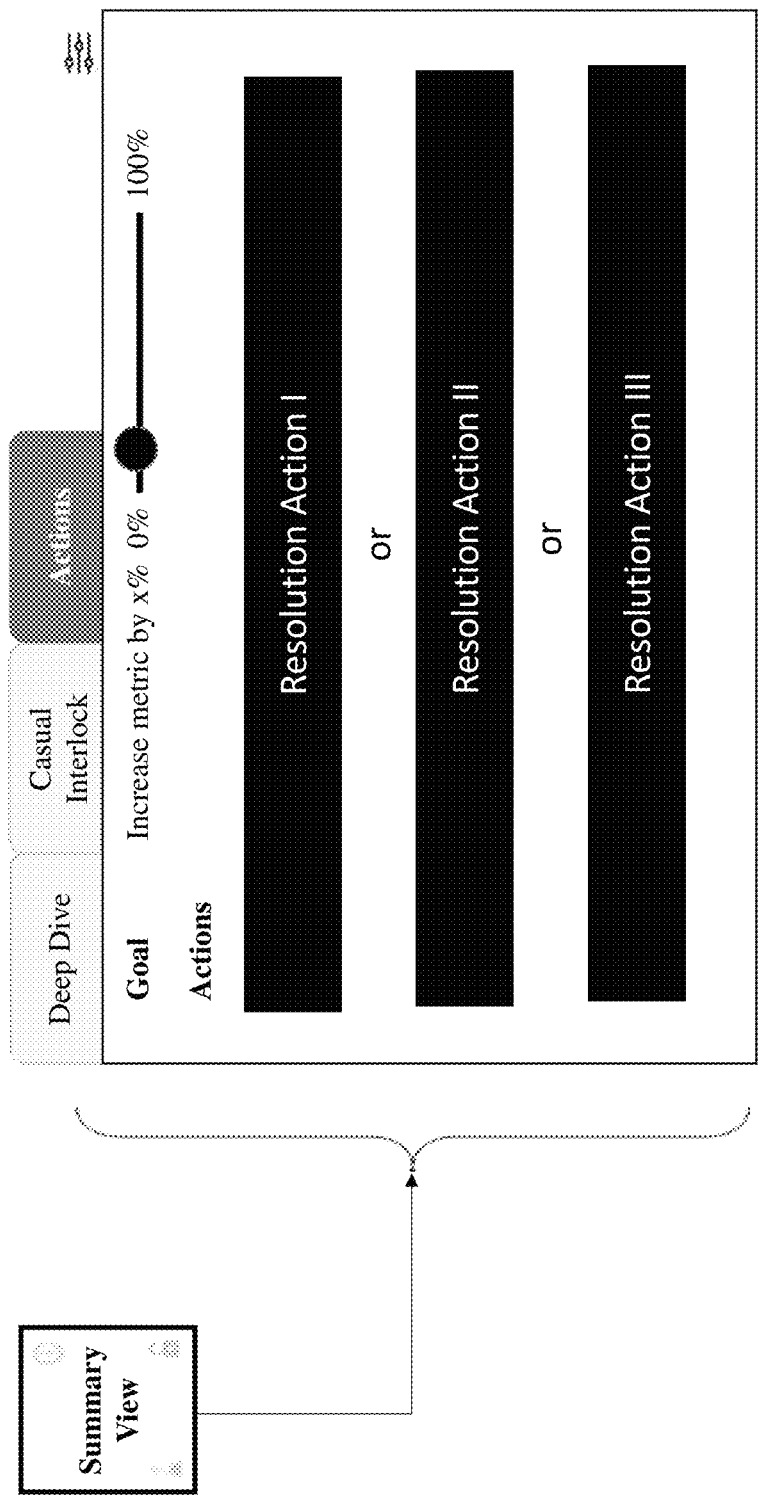
FIG. 7 illustrates a third expanded view of the widget associated with the enterprise metrics and key performance indicators (KPIs) data, in accordance with an embodiment of the present invention.

Referring to FIG. 7, a third expanded view of the widgets is provided. In yet another exemplary embodiment of the present invention, the one or more widgets are further configured to provide a third expanded view of the summary view. The third expanded view of the widget provides one or more pre-defined resolution actions to be performed on the causal insights data for achieving a pre-determined goal percentage associated with the causal insights data. The pre-determined goal percentage, to be achieved for the causal insights data, is determined by the end-user on the unified UI via the unified interface unit 210. The pre-defined resolution actions are carried out for remedying the causal insights data. The one or more pre-defined resolution actions are automatically generated by the causality unit 220 and provided to the end-user via the unified interface unit 210 on the user device 216 for achieving the pre-determined goal percentage. In an example, as illustrated in FIG. 7, the resolution actions provided to the end-user via the unified interface unit 210 on the user device 216 may be provided in a sequence including, but not limited to, resolution action I, resolution action II and resolution action III for achieving the pre-determined goal percentage. The resolution actions sequence is provided based on the effectiveness of the resolution action in achieving the pre-determined goal percentage. The end-user may select at least one of the pre-defined resolution actions from the generated pre-defined resolution actions for achieving the pre-determined goal percentage. In an example, if the sales of the particular product of the enterprise has decreased to 10% of the previous sales data and the end-user defines the pre-determined goal percentage as increasing the sales by 50%, then the causality unit 220 generates the one or more pre-defined resolution actions, which are provided to the end-user on the user device 216 and the end-user selects at least one of the pre-defined resolution actions for effectively achieving the pre-determined goal percentage. In another example, if the end user wants to increase customer satisfaction, relevant multiple options (identified by causality) are provided, such as, improving e-commerce experience, improving customer support, return policies, promotions etc.

Figure 8:
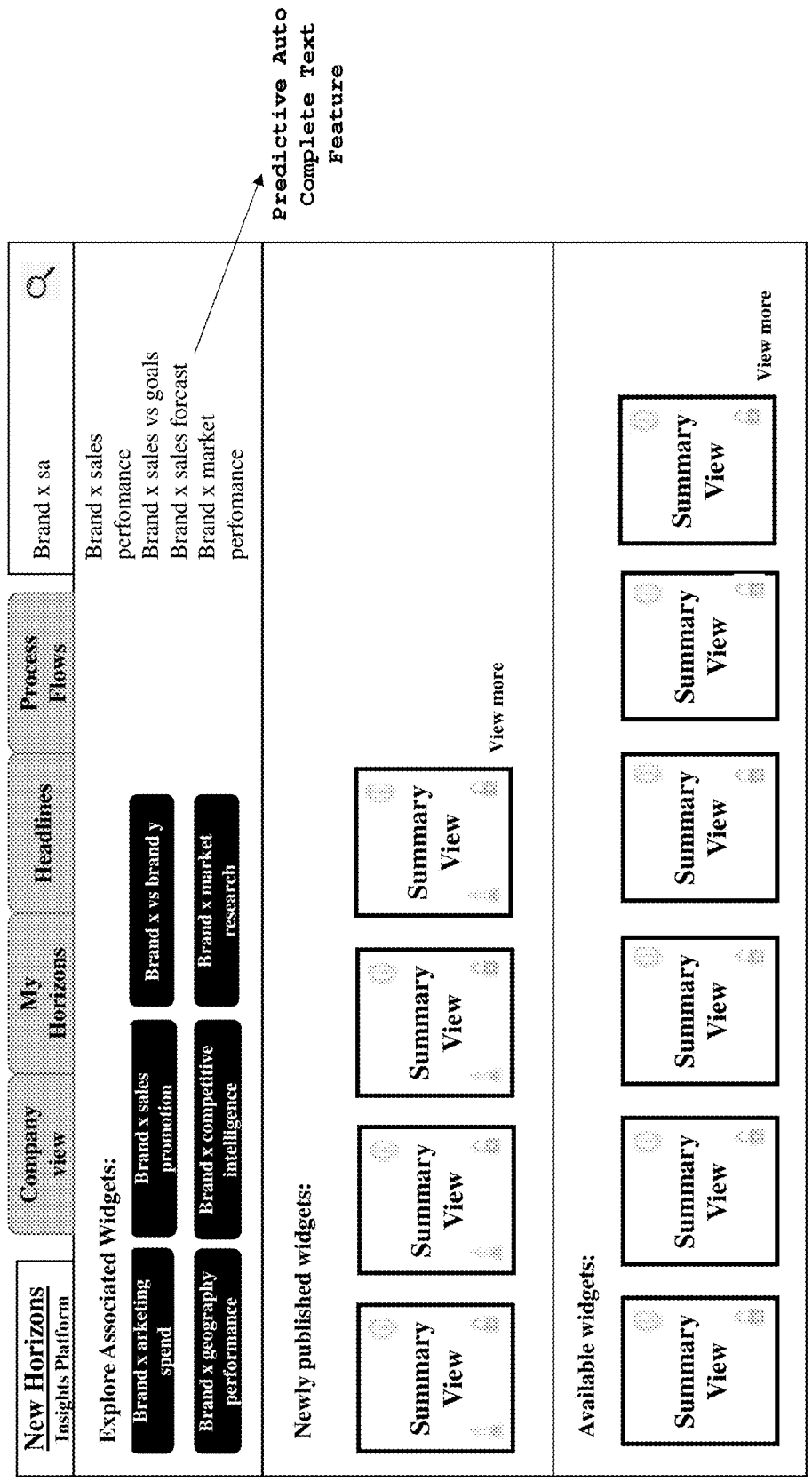
FIG. 8 is a screenshot of the unified UI illustrating predictive autocomplete feature, in accordance with an embodiment of the present invention.

In an embodiment of the present invention, referring to FIG. 8, intelligent search unit 242 of the unified interface unit 210 is configured to provide a predictive autocomplete text feature on the unified UI via an intelligent search bar. The end-user may search the one or more widgets relating to the enterprise metrics and KPIs data using the intelligent search bar provided at the top of the unified UI. The intelligent search unit 242 is configured to provide the widgets associated with the enterprise metrics and KPIs data based on the autocomplete text feature, which the end-user wishes to search. Further, various categories of the searched metrics and KPIs widgets are dynamically populated by the intelligent search unit 242 on the unified UI. The categories may include, but are not limited to, new widgets and available widgets. For example, if the end-user searches for widgets associated with the enterprise brand based metrics and KPIs data, then the intelligent search unit 242 in the intelligent search bar provides the autocomplete predictive text associated with the various categories of the brand metrics and KPIs widgets and dynamically populates the widgets associated with the searched metrics and KPIs data such as, but are not limited to, brand marketing spend, brand sales promotion and brand performance.

In another exemplary embodiment of the present invention, the unified interface unit 210 is configured to connect to voice bot feature of the user device 216 via the digital assistant unit 240 for providing widgets search associated with the metrics and KPIs data using a voice command given by the end-user. The voice bot feature on the user device 216 may include, but are not limited to, Amazon's Lex®, Amazon's Alexa®, Google Assistant® and Microsoft's Cortana®. The digital assistant unit 240 is further configured to analyze and process the voice commands given by the end-user based on at least natural language processing (NLP) and speech recognition techniques for providing the widgets associated with the metrics and KPIs data.

Figure 9:
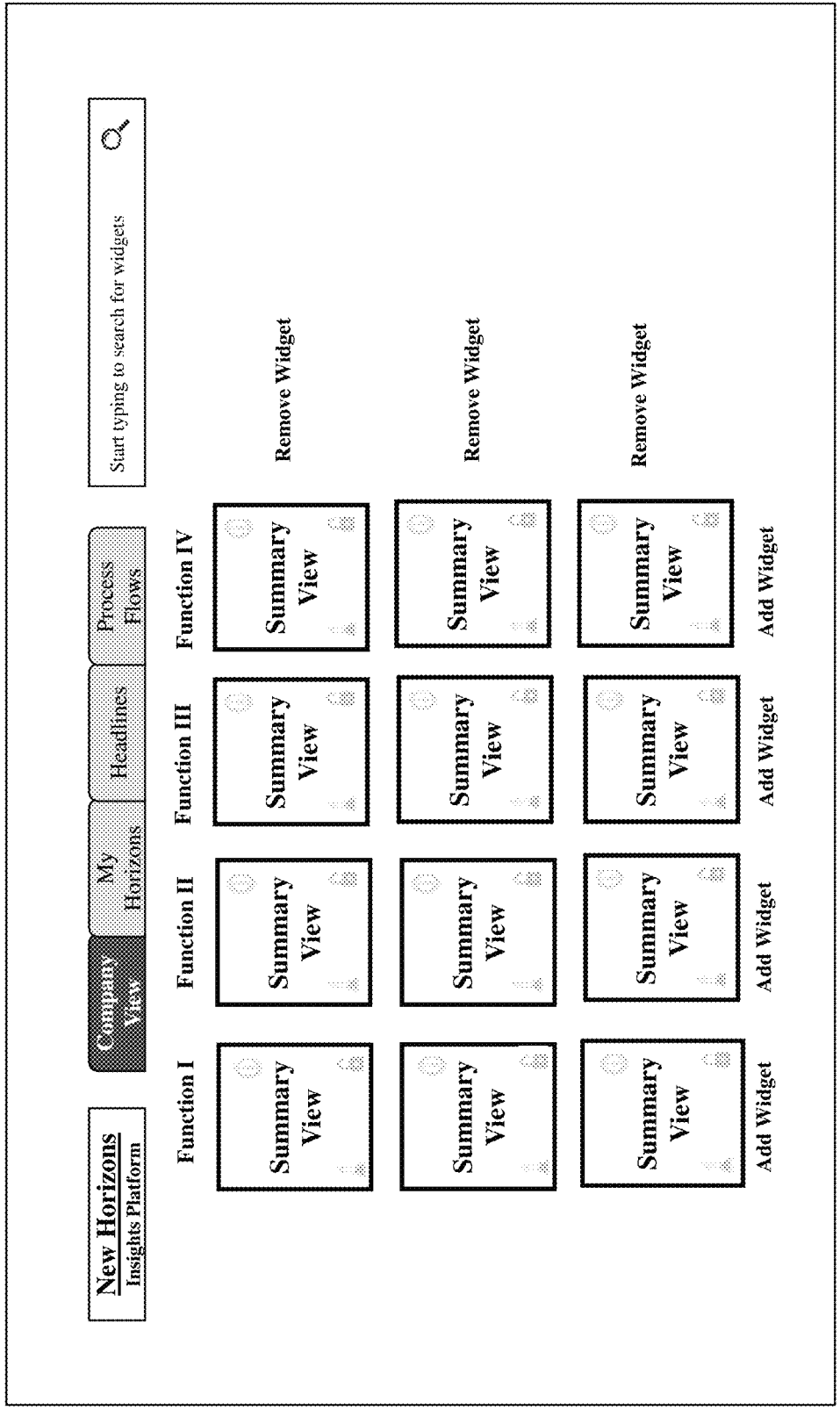
FIG. 9 is a screenshot of a customized unified UI which is an optimized actionable interface, in accordance with an embodiment of the present invention.

In an embodiment of the present invention, referring to FIG. 9, the feature set unit 244 of the unified interface unit 210 is configured to provide one or more feature sets for customizing the unified UI. The end-user may customize the UI interface based on the end-user needs and requirements. The widgets may be locked or unlocked on the unified UI based on the one or more feature sets. The locked widgets are not removable from the unified UI and the unlocked widgets are removable and may be customized based on the end-user needs and requirements. The feature set unit 244 is configured to provide one or more options to search, add, arrange or remove the one or more unlocked widgets from the unified UI based on the feature sets, analogues to adding and removing items from a cart on an e-commerce website. The end-user may add new widgets to the unified UI by swapping widgets option and remove the existing widgets by using a remove option. In an exemplary embodiment of the present invention, the add and remove options are provided based on techniques such as, but are not limited to, angular java-script (JS).

Figure 10:
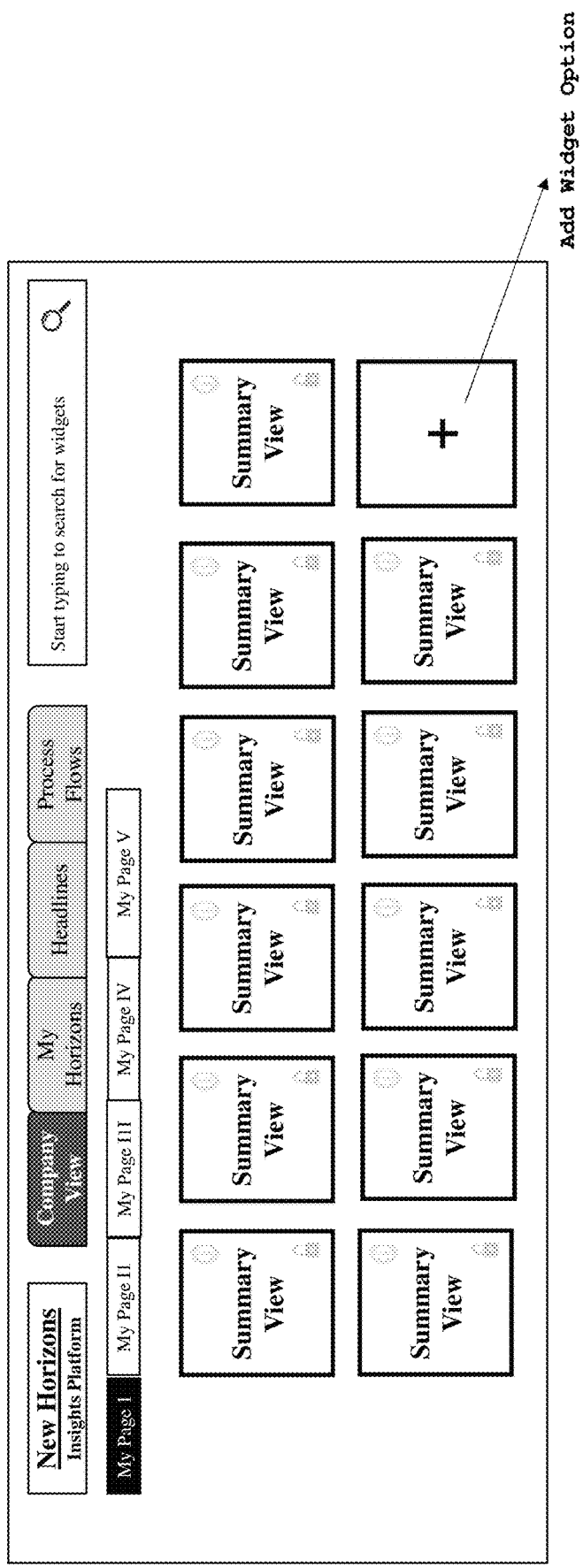
FIG. 10 is a screenshot of a personalized unified UI which is an optimized actionable interface, in accordance with an embodiment of the present invention.
Figure 11:
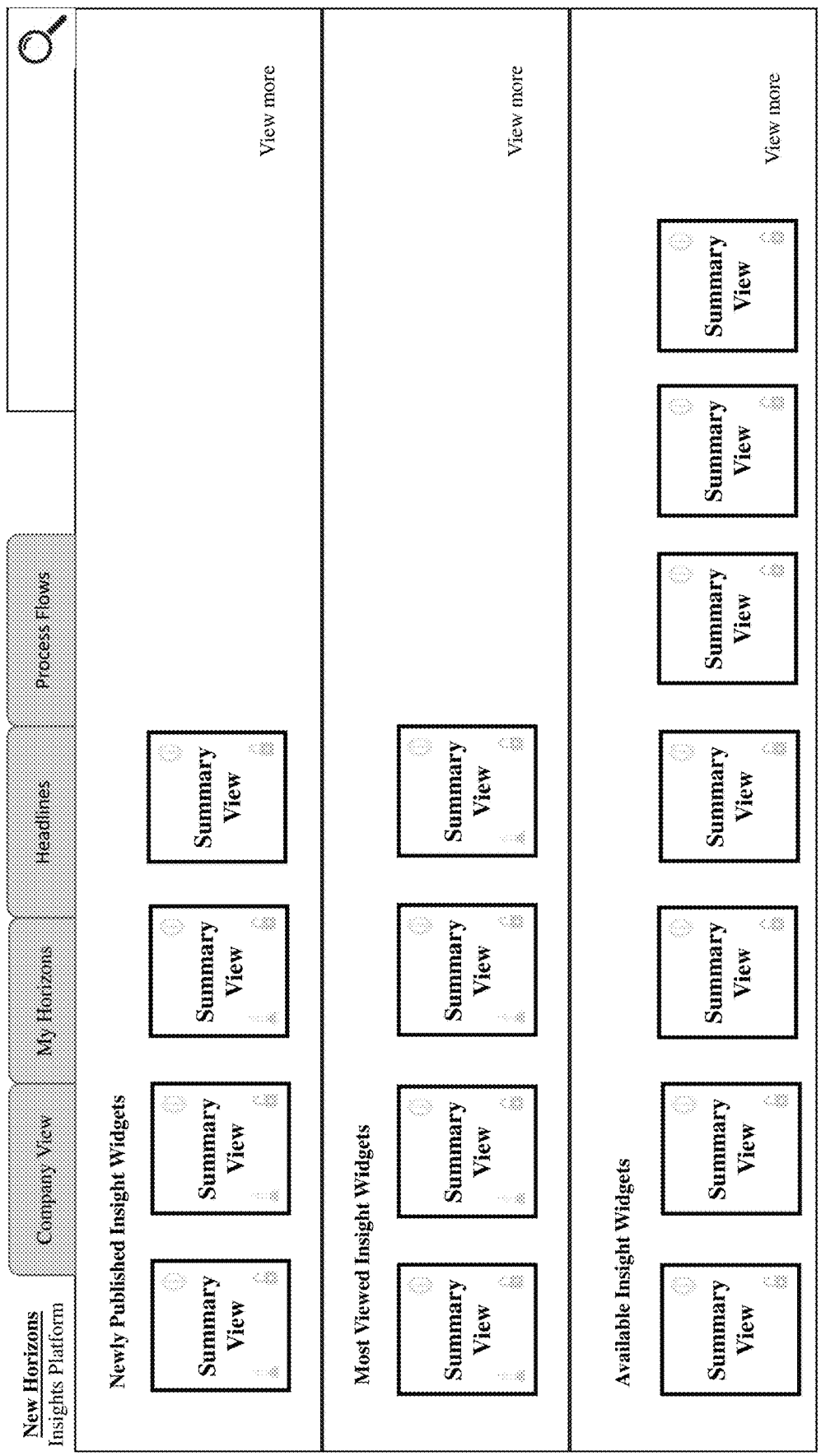
FIG. 11 is a screenshot of the unified UI illustrating one or more categories of the widgets associated with the enterprise metrics and KPIs data, in accordance with an embodiment of the present invention.

In another embodiment of the present invention, referring to FIG. 10, the feature set unit 244 of the unified interface unit 210 is configured to further provide the feature sets for personalizing the unified UI by the end-user. The end-user via the user device 216 may add one or more widgets associated with the metrics and KPIs data according to his needs and requirements to the unified UI, which the end-user may visualizes more often, based on the feature sets. Further, the end-user may create multiple pages with different metrics and KPIs data widgets on the unified UI for personalizing the unified UI. Yet further, the metrics and KPIs data widgets may be accessed and visualized on the unified UI by categorizing into the one or more categories, such as, but are not limited to, new widgets, most viewed widgets and available widgets, as illustrated in FIG. 11. The categorized widgets may be added to the customized unified UI or the personalized unified UI.

In an embodiment of the present invention, referring to FIG. 12, the unified interface unit 210 is further configured to generate and provide one or more alerts to the end-user on the user device 216. The alerts may relate to the key metrics and KPIs data for providing updates on latest trends of the key metrics and KPIs data. The alerts are in the form of headlines. The end-user may subscribe for receiving the alerts. Further, the end-user may subscribe to receive alerts in the form of the headlines including, but is not limited to, headlines subscribed by the end-user, headlines subscribed by the end-user's team and headlines subscribed by the end-user's division, as illustrated in FIG. 12. In an embodiment of the present invention, the unified interface unit 210 is configured to provide an option to receive feedback by the end-user regarding the received alert as good quality or poor quality. The unified interface unit 210 is configured to process the feedback for enhancing the quality and accuracy of the provided alerts.

Figure 13:
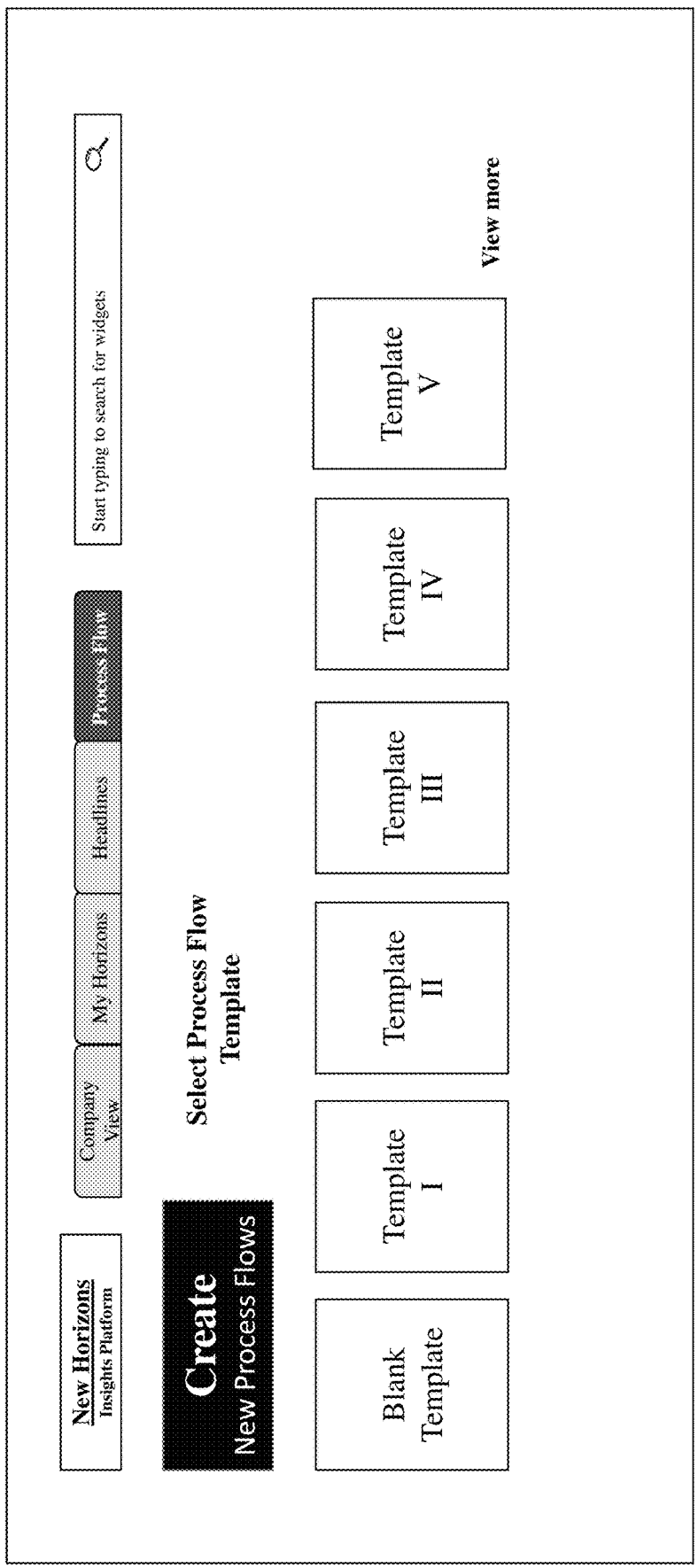
FIG. 13 is a screenshot of the unified UI illustrating templates for developing one or more process flows, in accordance with an embodiment of the present invention.
Figure 14:
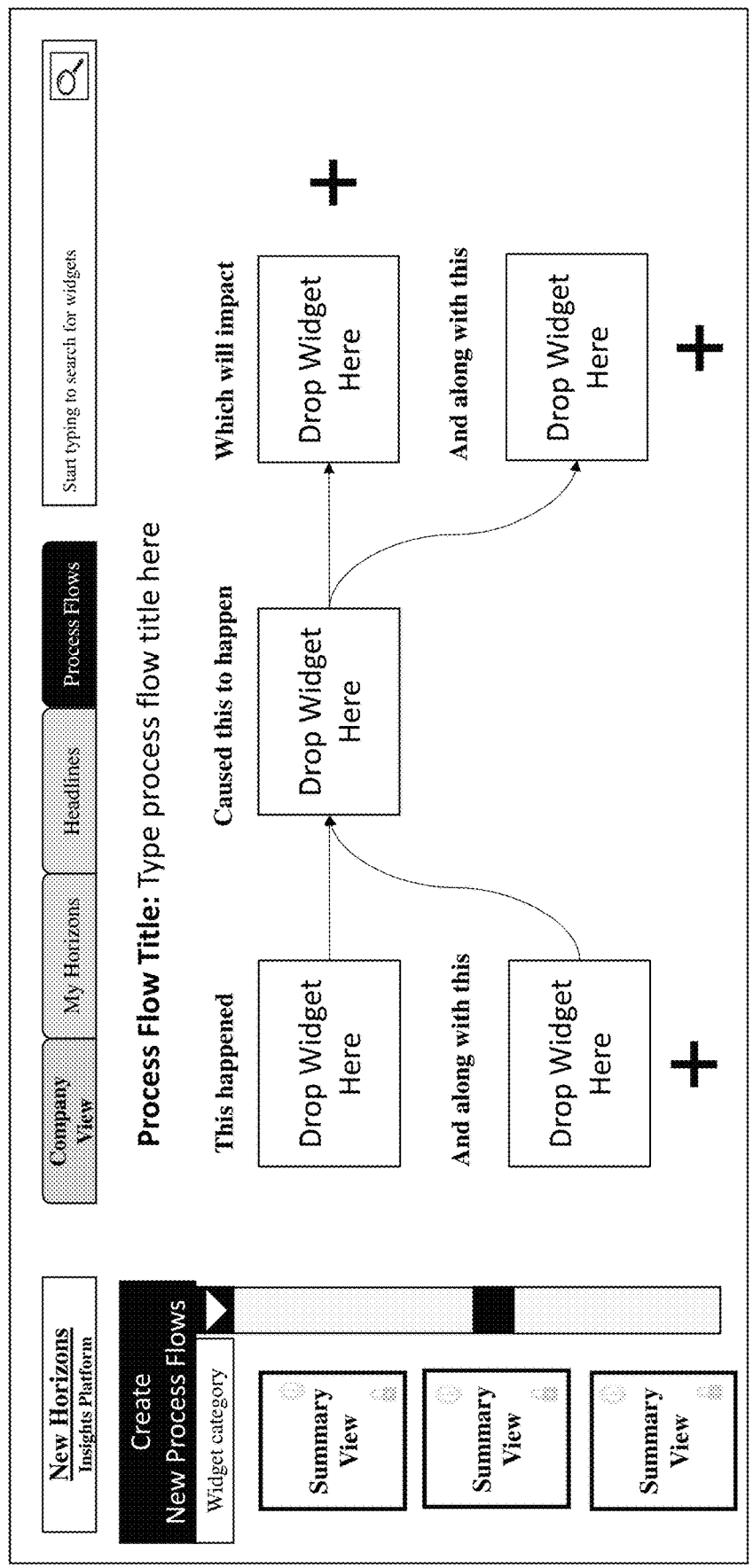
FIG. 14 is a screenshot of the unified UI illustrating expanded view of the templates for developing one or more process flows, in accordance with an embodiment of the present invention.
Figure 15:
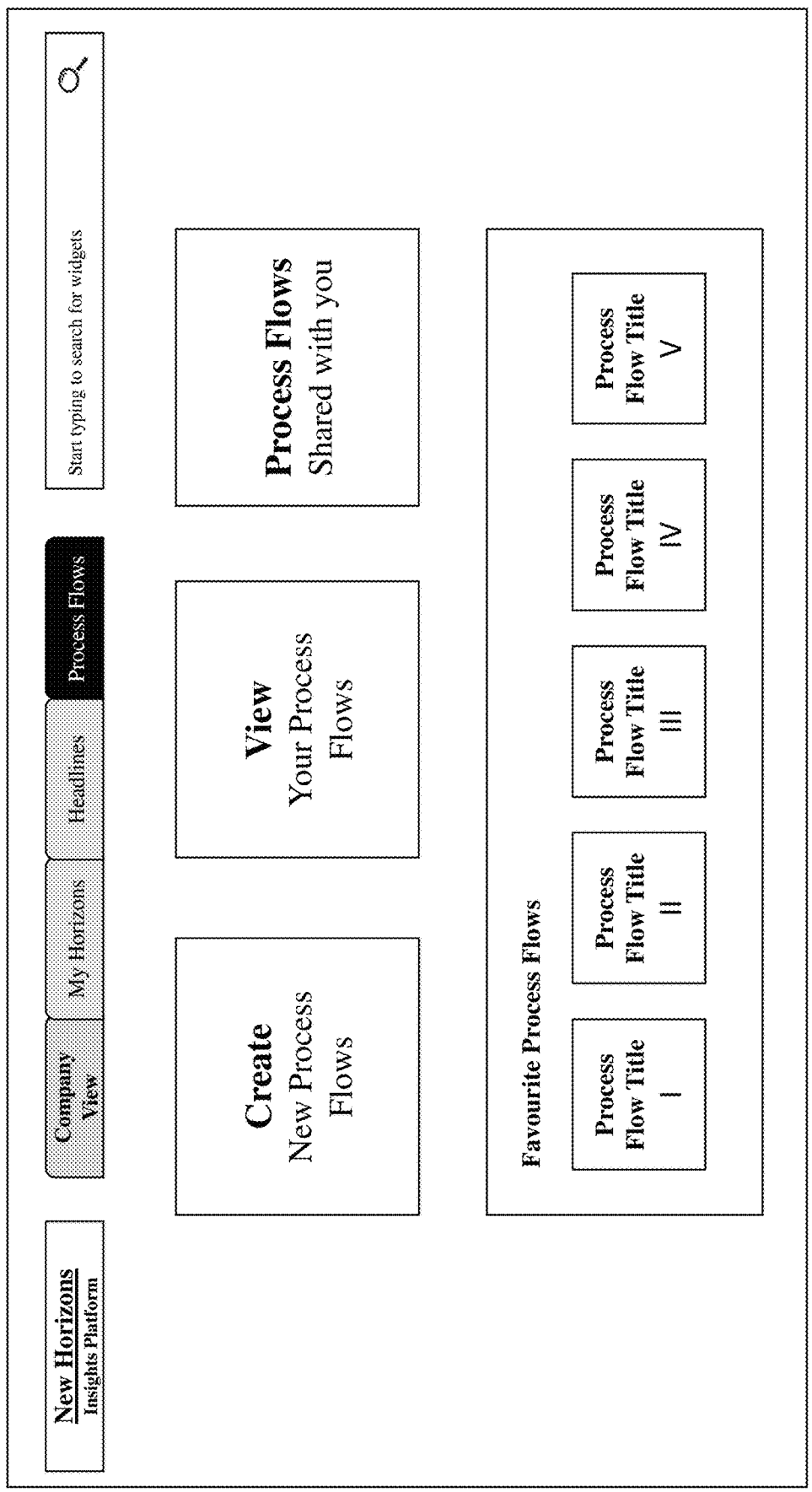
FIG. 15 is a screenshot of the unified UI illustrating one or more options associated with the developed process flows, in accordance with an embodiment of the present invention.

In an embodiment of the present invention, the data template unit 238 of the unified interface unit 210 is configured to generate one or more templates and provide on the unified UI to the end-user for developing one or more process flows, using the metrics and KPIs widgets, in order to describe the events data associated with the one or more metrics and KPIs data, as illustrated in FIG. 13. The events data associated with the metrics and KPIs data may include, but is not limited to, type of the event, cause of the event, effect of the event and steps required to minimize the effect of the event. The process flow relates to sequencing of widgets associated with the metrics and KPIs data in a series of events. The end-user may select one or more templates from the generated templates provided by the data template unit 238 for developing a process flow. In an exemplary embodiment of the present invention, the templates comprise web frames in which widgets may be dragged and dropped and further the templates may be arranged in the form of a process flow. The data template unit 238 connects to the widgets catalogue unit 228 for fetching the catalogued widgets, which are provided to the end-user via the user device 216. The end-user selects the appropriate one or more widgets associated with the metrics and KPIs data from the catalogued widgets according to his needs and requirements for developing the process flow. In an exemplary embodiment of the present invention, referring to FIG. 14, the selected process flow template provides an expanded view to the end-user. Further, the end-user selects the required widgets from the catalogued widgets and subsequently drags and drops the selected widget in the expanded view of the process flow template for developing a process flow describing a series of events associated with the metrics and KPIs data. The templates in which the widgets are dragged and dropped may be linked with arrows in order to illustrate a sequence of the process flow and further text data may also be added to provide detailed descriptions. In an example, the process flow may be developed for a declining product sales for a certain geography due to negative product reviews and customer feedback based on poor product quality. The end-user may develop the process flow by dragging and dropping the widgets to describe that the sales declined, using a sales widget. Further, using a feedback widget, it is described that the sales declined in the last three months due to negative reviews. Yet further, using a product quality widget, the poor quality product is described. Further, if sales decline is not checked, then the negative feedbacks may affect other geographies also, which is described using a customer perception influence map widget and a decline in sales in the said geographies which may be expected is described using a sales forecast widget. Further, the developed process flow provides option for at least saving, sharing, collaborating and modifying the developed process flow. Further, the data template unit 238 provides one or more options associated with the developed process flow on the user device 216 such as, but are not limited to, the developed process flows, viewing of the developed process flow, shared process flows and favorite process flows, as illustrated in FIG. 15.

In an embodiment of the present invention, the widgets catalogue unit 228 via the metadata management unit 230 is configured to connect to the accessibility and security unit 232 of the security and tracking unit 208. In an exemplary embodiment of the present invention, the accessibility and security unit 232 of the security and tracking unit 208 is built based on the custom web applications such as, but are not limited to, HTML5, MySQL, Angular, which are further integrated with Single Sign-On (SSO) service and Lightweight Directory Access Protocol (LDAP) application. The accessibility and security unit 232 is configured with security policies for generating unique user identification (ID) details for each end-user that accesses the unified UI via the user device 216 in order to provide correct metrics and KPIs data widgets to the correct end-user.

In an embodiment of the present invention, the user input tracking unit 234 of the security and tracking unit 208 is configured to connect to the unified interface unit 210 for tracking and capturing the end-user activity on the unified UI via the user device 216 while accessing various metrics and KPIs data widgets. In another embodiment of the present invention, the user input tracking unit 234 is configured to track the user activity based on creating and embedding one or more tags in the unified UI. The tags capture the end-user clicks and actions on the unified UI. The end-user activity is tracked and captured based on number of clicks made by the end-user on the unified UI via the user device 216. In an exemplary embodiment of the present invention, the user input tracking unit 234 is build based on one or more tracking tools, such as, but is not limited to, Adobe® Target. Further, the tags are embedded in the unified UI using the Adobe® Target. In an embodiment of the present invention, the user input tracking unit 234 is further configured to timestamp the end-user activity carried out on the unified UI via the user device 216 and store the timestamped end-user activity in the content management unit 236. The end-user activity may include, but is not limited to, the type of metrics and KPIs data widgets accessed and used by the end-user, when the metrics and KPIs data widgets are accessed and used by the end-user, sequence of accessing and using the metrics and KPIs data widgets and the metrics and KPIs data widgets searched by the end-user. The user input tracking unit 234 is configured to analyze the tracked and captured user activity in order to provide further customization and personalization of the unified UI.

In an embodiment of the present invention, the content management unit 236 of the security and tracking unit 208 is configured to connect to the user input tracking unit 234 for determining and reviewing the most used metrics and KPIs data widgets and the least used metrics and KPIs data widgets for effectively tracking and capturing the end-user activity on the unified UI. In an embodiment of the present invention, the content management unit 236 is configured to analyze the stored timestamped end-user activity for determining and reviewing the most and the least used metrics and KPIs data widgets. The content management unit 236 mines the stored timestamped end-user activity for determining insights including, but is not limited to, most used widgets, least used widgets and frequency of usage of widgets by the end-user. Tracking and capturing the end-user activity on the unified UI provides personalized widget recommendations to the end-users.

Figure 16:
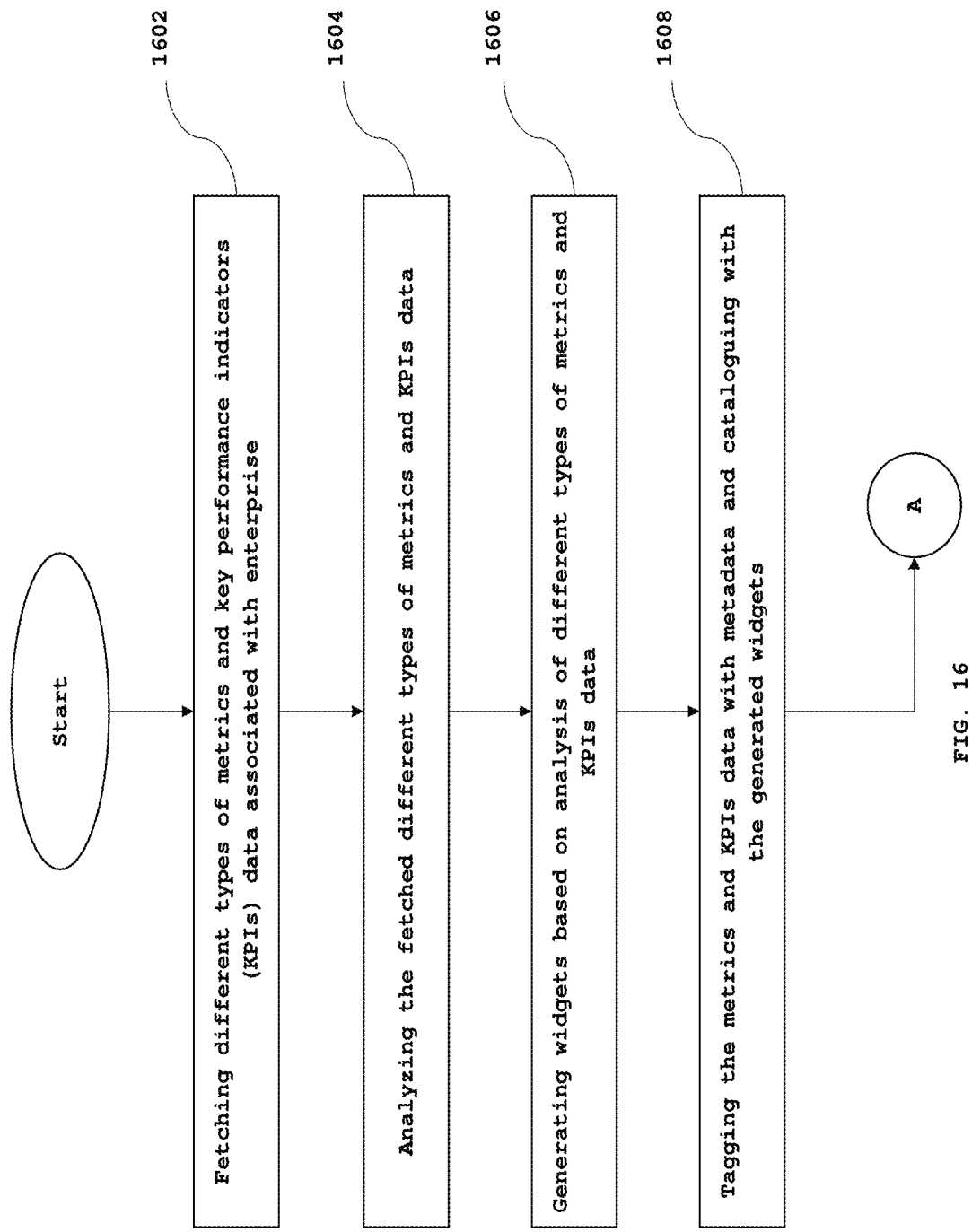
FIG. 16 and FIG. 16A is a flowchart illustrating a method for creating an optimized actionable interface for data access and visualization, in accordance with an embodiment of the present invention.
Figure 16A:
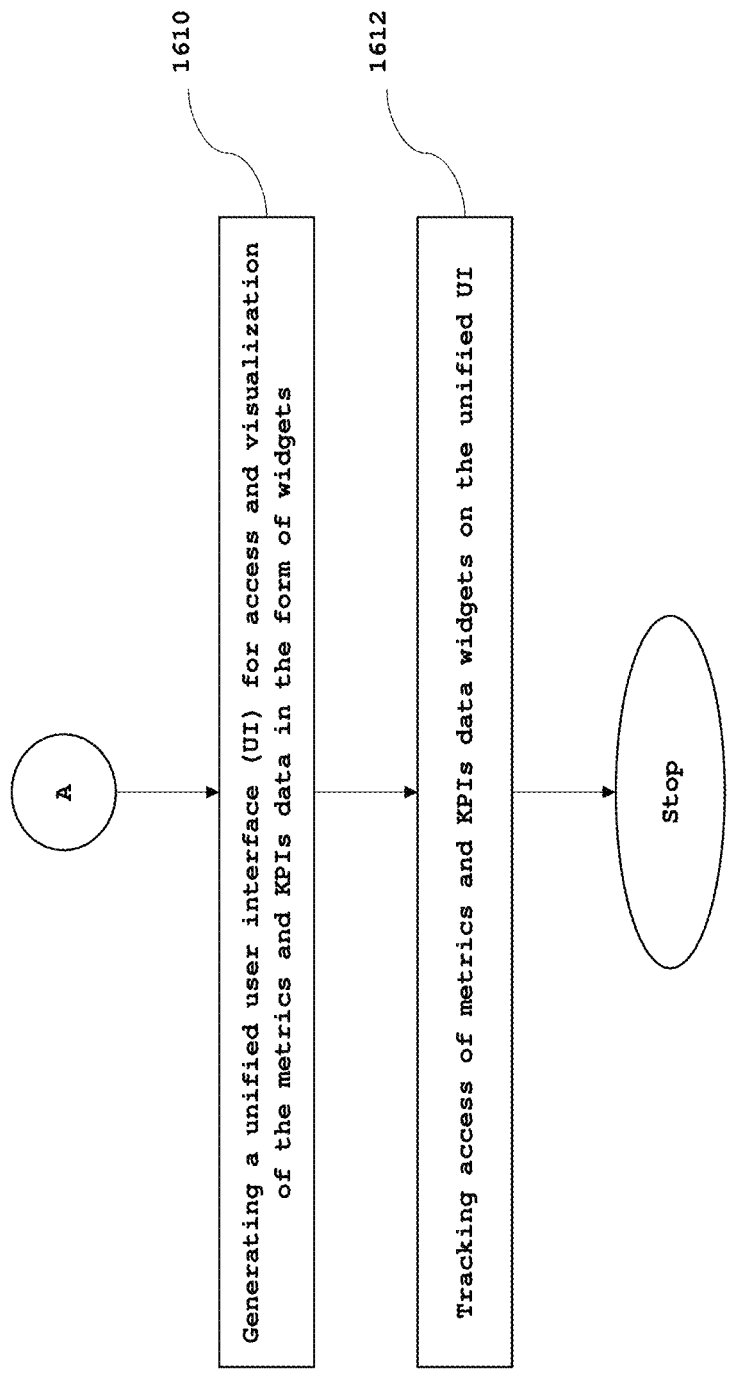

FIG. 16 and FIG. 16A is a flowchart illustrating a method for creating an optimized actionable interface for data access and visualization, in accordance with various embodiments of the present invention.

At step 1602, different types of metrics and key performance indicators (KPIs) data associated with enterprise is fetched. In an embodiment of the present invention, The different types of data associated with one or more metrics and key performance indicators (KPIs) are fetched using business intelligence (BI) tools, the natural language processing (NLP) tools and the robotic automation tools fetches the different types of metrics and KPIs data associated with the enterprises.

In an exemplary embodiment of the present invention, the different types of metrics and KPIs data fetched may include, but is not limited to, syndicated data, business intelligence (BI) models and charts data, non-syndicated data and data associated with various enterprise operational systems. The syndicated data and the business intelligence (BI) models and charts data is fetched from data warehouses, data marts, data lakes and data files. The non-syndicated data is fetched from external and internal website systems and portals associated with the enterprise. In an exemplary embodiment of the present invention, the syndicated data and business intelligence (BI) models and charts data is fetched by the business intelligence (BI) tools and the natural language processing (NLP) tools as a data as a service (DaaS) over a communication network. In another exemplary embodiment of the present invention, the non-syndicated data and data from various enterprise operational systems is fetched by the robotic automation tools as a content as a service (CaaS) over the communication network. In yet another exemplary embodiment of the present invention, the data, fetched by the business intelligence (BI) tools, the natural language processing (NLP) tools and the robotic automation tools is transmitted as a virtualization as a service (VaaS) over the communication network using one or more APIs and dynamic visualization tools, which is provided to the end-user for processing the data and creating an interactive actionable interface for optimized access and visualization of data. In an embodiment of the present invention, the fetched different types of metrics and KPIs data is processed for converting the data into a suitable format for access and visualization of the said data to the end-user.

At step 1604, the fetched different types of metrics and KPIs data is analyzed. In an embodiment of the present invention, the different types of metrics and KPIs data is analyzed for determining modifications and changes in the enterprise data, that may have been carried out at the enterprise end. Modifications in KPIs and metrics are identified based on a rule based technique, outlier (trend break), threshold, pattern (e.g. occurrence), machine learning based dynamic thresholds or any AI driven threshold techniques. In an embodiment of the present invention, the metrics and KPIs data are analyzed for determining one or more signals associated with the modifications and changes in the metrics and KPIs data. Further, one or more pre-defined rules are applied to measure strength and consistency of the associated signals. The signals are detected that change with respect to metrics and KPIs data. The changes in generated signals are determined for further efficiently informing the end-user on potential changes to the business processes being measured. Further, each signal is associated with a trigger, which is prioritized for activation based on a number of generated triggers. In an embodiment of the present invention, each trigger has one or more actions associated with it and a corresponding action associated with the trigger is executed based on the activated trigger. Further, the end-user may subscribe to be alerted, if the market share declines consecutively for three weeks. Consequently, if the market share declines, a signal is generated and a trigger associated with the signal may be generated, if market share declines for three consecutive weeks. Further, one or more rules may be included for executing an action associated with the trigger, which may include, but is not limited to, sending an alert notification to the end-user via an email.

In an embodiment of the present invention, the different types of metrics and KPIs data is further analyzed for identifying one or more key metrics and KPIs data that may have causal relationship with a desired outcome, which is represented by causal attribution data. In an exemplary embodiment of the present invention, techniques such as functional point analysis, causality & correlation, and mutual information theory etc. may be used to identify the causal attribution data. In an example, if the end outcome is to improve national product market share by 10% percent, causality analysis includes analyzing all relevant variables pertaining to sales, marketing, product support, customer complaints and feedback, brand perception etc. and identify the specific variables which, when acted upon would result in achieving the desired outcome. Further, the one or more key metrics and KPIs data may be associated with sales, such as, but are not limited to, product type data, promotional efforts data, customer perception surveys data, customer complaints data and product quality data. The key metrics and KPIs data associated with sales may further have a causal relationship with a desired outcome of promotional efforts and customer perception which is represented by the causal attribution data. In an embodiment of the present invention, the causal attribution data between the key metrics and KPIs data is identified and further one or more causal parameters for the key metrics or KPI data is determined. In an embodiment of the present invention, an attribution tree is generated that provides an effect of change of one key metric s and KPIs data on another key metrics and KPIs data, in isolation as well in conjunction.

At step 1606, widgets are generated based on analysis of different types of metrics and KPIs data. In an embodiment of the present invention, modifications of the metrics and KPIs data and signals are analyzed for generating end-user specific recommendations associated with metrics and KPIs data in the form of one or more widgets for access and visualization of the metrics and KPIs data by the end-user. In an exemplary embodiment of the present invention, the recommendations may include, but are not limited to, most viewed metrics and KPIs data widgets, relevant metrics and KPIs data widgets, new metrics and KPIs data widgets based on the end-user viewing preference and metrics and KPIs data widgets that the end-user may view based on the day and month or an event. For example, if the end-user is associated with marketing functions and one or more of the end-users regularly view five specific widgets associated with the metrics and KPIs data, then the most viewed widgets are recommended to the end-user. Further, if there is a pattern in the sequence of viewing of widgets by the end users, such as, firstly, viewing market share widget; secondly, viewing product promotion widget; thirdly, viewing customer complaints widget; and lastly, viewing produce perception widget, then the end-user is recommended the widgets viewed in the pattern. Further, the recommendations are made based on analyzing end-user viewing patterns.

In an embodiment of the present invention, the causal attribution data between the key metrics and KPIs data is analyzed for determining a causal insights data associated with the key metrics and KPIs data in the form of the one or more widgets. The causal insights data relates to a causal relationship between the metrics and KPIs data, providing the effect of change of one key metric and KPI data on the another key metric and KPI data and vice versa, which are viewed by the end-user in the form of the one or more widgets. For example, product sales data may have a causal relationship with production promotion data and customer complaints data. Further, customer complaints data may have a causal relationship with product quality. In the event, the end-user views a widget comprising the product sales, the end-users may visualize the effect of metrics and KPIs data on the product sales data such as, the product promotion data, the customer complaints data and the product quality data. Therefore, if product complaints are increasing and in the event it is determined that the product complaints have a causal relationship with product market share, the end-user may visualize the impact of increasing product complaints, i.e. decreasing of product market share.

At step 1608, the metrics and KPIs data is tagged with metadata and catalogued with the generated widgets. In an embodiment of the present invention, the metrics and KPIs data is tagged with metadata associated with the metrics and KPI data before being transmitted to the end-user. The metadata tagged metrics and KPIs data is catalogued in the form of the one or more metrics and KPIs data widgets. In an exemplary embodiment of the present invention, the catalogued metadata tagged metrics and KPIs data may include, but is not limited to, widget title, metrics and KPI's data, product name data, data quality status, published date and refreshed date. In an embodiment of the present invention, the tagged metadata is stored in one or more structured application management tables. In an exemplary embodiments of the present invention, the structured application management tables comprises the metadata information such as, but is not limited to, a widget composition summary, a widget metadata summary, a widget connection settings, end-user type, end-user hierarchy, widget security and one or more operational characteristics of one or more web applications such as, but are not limited to, access, security and data visibility.

At step 1610, a unified user interface (UI) is generated for access and visualization of the metrics and KPIs data in the form of widgets. In an embodiment of the present invention, the unified UI is provided to the end-user is a dynamic interactive actionable interface. In an exemplary embodiment of the present invention, the unified UI comprises a navigation bar at the top (as shown in FIG. 3). Further, the unified UI comprises an intelligent search bar for carrying out predictive search. Yet further, the unified UI comprises the widgets associated with the enterprise metrics and KPIs data. The widgets may be added or removed by the end-users based on their requirements. The widgets are in the form of a card of at least square shape and rectangular shape and have metadata corresponding to the metrics and KPIs data associated with it.

In an exemplary embodiment of the present invention, the widgets are configured to provide one or more metrics and KPIs data of an enterprise in a summary view (as shown in FIG. 4). The summary view provides a visual cue for comparison against a benchmark metrics. The visual cue may includes, but is not limited to, a traffic light (green, red, yellow), arrows (up and down) and embedded mini charts (e.g. bar charts). The widgets associated with the enterprise metrics and KPIs data may be organized, analyzed and visualized by the end-user. Further, the widgets provide information such as, but is not limited to, metric and KPIs definition data, enterprise end-users, data quality status and refresh frequency data. The one or more widgets are configured to be locked for fixing them on the unified UI or unlocked for removing them from the unified UI. Further, the widget provides information related to whether the metrics and KPIs data has been validated and tested. In an exemplary embodiment of the present invention, testing is carried out to determine whether a) the underlying data used to compute the metrics and KPIs data has been certified as accurate, b) the process to compute the metrics and KPIs data has been applied consistently and correctly and c) the metrics and KPIs data has been reviewed and validated as accurate. Therefore, the validation and testing of metrics and KPIs data includes, but is not limited to, confirming whether the process to compute the metrics and KPIs data has been carried out based on one or more pre-defined guidelines and rules, the data used for computation is error free in order to protect the metrics and KPIs data from getting skewed and the metrics and KPIs data displayed in the widget is similar to the computed metrics and KPIs data.

In another exemplary embodiment of the present invention, the one or more widgets are further configured to provide a first expanded view of the summary view. The first expanded view of the widgets provides at least an elaborated view of the summary view referred to as a deep drive view (as shown in FIG. 5). The first expanded view provides data associated with the metrics and KPIs data in a grid of dimension m×n (e.g. 2×2 grid). Further, the metrics and KPIs data in the first expanded view is capable of being filtered according to the needs and requirements of the end-user. For, example, the end-user may want to view only productions data or costs data, which he may filter accordingly.

In another exemplary embodiment of the present invention, the one or more widgets are further configured to provide a second expanded view of the summary view. The second expanded view of the widgets provides causal insights data referred to as causal interlock data comprising at least cause of change in a particular metrics and KPIs data and effect of the said change of the particular metrics and KPIs data on the other metrics and KPIs data and super variables data associated with the enterprise and vice versa (as shown in FIG. 6). The super variables data relates to the compounded effect of variables in conjunction with each other. The causal interlock provides one or more variables that predicts the outcome of the metrics and KPIs data viewed and measures a compounded effect of variables in conjunction with each other (referred as the super variables).

In yet another exemplary embodiment of the present invention, the one or more widgets are further configured to provide a third expanded view of the summary view. The third expanded view of the widget provides one or more pre-defined resolution actions to be performed on the causal insights data for achieving a pre-determined goal percentage associated with the causal insights data. The pre-determined goal percentage, to be achieved for the causal insights data, is determined by the end-user on the unified UI. The pre-defined resolution actions are carried out for remedying the causal insights data. The one or more pre-defined resolution actions are automatically generated and provided to the end-user for achieving the pre-determined goal percentage. The end-user may select at least one of the pre-defined resolution actions from the generated pre-defined resolution actions for achieving the pre-determined goal percentage (as shown in FIG. 7). In an example, if the end user wants to increase customer satisfaction, relevant multiple options (identified by causality) are provided, such as, improving e-commerce experience, improving customer support, return policies, promotions etc.

In an embodiment of the present invention, a predictive autocomplete text feature of the unified UI is provided via an intelligent search bar on the unified UI (as shown in FIG. 8). The end-user may search the one or more widgets relating to the enterprise metrics and KPIs data using the intelligent search bar provided at the top of the unified UI. The intelligent search bar provides the widgets associated with the enterprise metrics and KPIs data based on the autocomplete text feature, which the end-user wishes to search. Further, various categories of the searched metrics and KPIs widgets are dynamically populated on the unified UI. The categories may include, but are not limited to, new widgets and available widgets. For example, if the end-user searches for widgets associated with the enterprise brand based metrics and KPIs data, then the intelligent search bar provides the autocomplete predictive text associated with the various categories of the brand metrics and KPIs widgets and dynamically populates the widgets associated with the searched metrics and KPIs data such as, but are not limited to, brand marketing spend, brand sales promotion and brand performance.

In another exemplary embodiment of the present invention, the widgets associated with the metrics and KPIs data are searched using a voice command given by the end-user. The voice commands given by the end-user are analyzed and processed based on at least natural language processing (NLP) and speech recognition techniques for providing the widgets associated with the metrics and KPIs data.

In an embodiment of the present invention, one or more feature sets are provided for customizing the unified UI. The end-user may customize the UI interface based on the end-user needs and requirements. The widgets may be locked or unlocked on the unified UI based on the one or more feature sets. The locked widgets are not removable from the unified UI and the unlocked widgets are removable and may be customized based on the end-user needs and requirements. One or more options are provided to search, add, arrange or remove the one or more unlocked widgets from the unified UI based on the feature sets, analogues to adding and removing items from a cart on an e-commerce website. The end-user may add new widgets to the unified UI by swapping widgets option and removing existing widgets by using a remove option (as shown in FIG. 9). In an exemplary embodiment of the present invention, the add and remove options are provided based on techniques such as, but are not limited to, angular java-script (JS).

In another embodiment of the present invention, the feature sets provide for personalizing the unified UI by the end-user (as shown in FIG. 10). The end-user via the user device may add one or more widgets associated with the metrics and KPIs data according to his needs and requirements to the unified UI, which the end-user may visualize more often, based on the feature sets. Further, the end-user may create multiple pages with different metrics and KPIs data widgets on the unified UI for personalizing the unified UI. Yet further, the metrics and KPIs data widgets may be accessed and visualized on the unified UI by categorizing into the one or more categories, such as, but are not limited to, new widgets, most viewed widgets and available widgets (as shown in FIG. 11). The categorized widgets may be added to the customized unified UI or the personalized unified UI.

In an embodiment of the present invention, one or more alerts are generated and provided to the end-user on the user device. The alerts may relate to the key metrics and KPIs data for providing updates on latest trends of the key metrics and KPIs data. The alerts are in the form of headlines and he end-user may subscribe for receiving the alerts (as shown in FIG. 12). Further, the end-user may subscribe to receive alerts in the form of the headlines including, but is not limited to, headlines subscribed by the end-user, headlines subscribed by the end-user's team and headlines subscribed by the end-user's division. In an embodiment of the present invention, an option is also provided for receiving feedback by the end-user regarding the received alert as good quality or poor quality. The feedback is processed for enhancing the quality and accuracy of the provided alerts.

In an embodiment of the present invention, one or more templates are generated and provided on the unified UI to the end-user for developing one or more process flows, using the metrics and KPIs widgets, in order to describe the events data associated with the one or more metrics and KPIs data (as shown in FIG. 13). The events data associated with the metrics and KPIs data may include, but is not limited to, type of the event, cause of the event, effect of the event and steps required to minimize the effect of the event. The process flow relates to sequencing of widgets associated with the metrics and KPIs data in a series of events. The end-user may select one or more templates from the generated templates for developing a process flows. In an exemplary embodiment of the present invention, the templates comprise web frames in which widgets may be dragged and dropped and further the templates may be arranged in the form of a process flow. The catalogued widgets are fetched and provided to the end-user via the user device. The end-user selects the appropriate one or more widgets associated with the metrics and KPIs data from the catalogued widgets according to his needs and requirements for developing the process flows. In an exemplary embodiment of the present invention, the selected process flow template provides an expanded view to the end-user (as shown in FIG. 14). Further, the end-user selects the required widgets from the catalogued widgets and subsequently drags and drops the selected widget in the expanded view of the process flow template for developing a process flow describing a series of events associated with the metrics and KPIs data. The templates in which the widgets are dragged and dropped may be linked with arrows in order to illustrate a sequence of the process flow and further text data may also be added to provide detailed descriptions. In an example, the process flow may be developed for a declining product sales for a certain geography due to negative product reviews and customer feedback based on poor product quality. The end-user may develop the process flow by dragging and dropping the widgets to describe that the sales declined, using a sales widget. Further, using a feedback widget, it is described that the sales declined in the last three months due to negative reviews. Yet further, using a product quality widget, the poor quality product is described. Further, if sales decline is not checked, then the negative feedbacks may affect other geographies also, which is described using a customer perception influence map widget and a decline in sales in the said geographies, which may be expected, is described using a sales forecast widget. Further, the developed process flow provides option for at least saving, sharing, collaborating and modifying the developed process flow. The unified interface unit 210 provides one or more options associated with the developed process flows on the user device such as, but are not limited to, the developed process flows, viewing of the developed process flows, shared process flows and favorite process flows (as shown in FIG. 15).

At step 1612, the access of the metrics and KPIs data widgets on the unified UI is tracked. In an embodiment of the present invention, security policies are used for generating unique user identification (ID) details for each end-user that accesses unified UI via the user device in order to provide correct metrics and KPIs data widgets to the correct end-user. In an embodiment of the present invention, the end-user activity on unified UI is tracked and captured via the user device while accessing various metrics and KPIs data widgets. In another embodiment of the present invention, the user activity is tracked based on creating and embedding one or more tags in the unified UI. The tags capture the end-user clicks and actions on the unified UI. The end-user activity is tracked and captured based on number of clicks made by the end-user on the unified UI. In an exemplary embodiment of the present invention, the user input tracking unit 234 is build based on one or more tracking tools, such as, but is not limited to, Adobe® Target. Further, the tags are embedded in the unified UI using the Adobe® Target. In an embodiment of the present invention, the end-user activity carried out on the unified UI is time-stamped and stored. The end-user activity may include, but is not limited to, the type of metrics and KPIs data widgets accessed and used by the end-user, when the metrics and KPIs data widgets are accessed and used by the end-user, sequence of accessing and using the metrics and KPIs data widgets and the metrics and KPIs data widgets searched by the end-user. The tracked and captured user activity is analyzed in order to provide further customization and personalization of the unified UI.

In an embodiment of the present invention, the most used metrics and KPIs data widgets and the least used metrics and KPIs data widgets are determined and reviewed for effectively tracking and capturing the end-user activity on the unified UI. In an embodiment of the present invention, the stored timestamped end-user activity is analyzed for determining and reviewing the most and the least used metrics and KPIs data widgets. The stored timestamped end-user activity is mined for determining insights including, but is not limited to, most used widgets, least used widgets and frequency of usage of widgets by the end-user.

Advantageously, in accordance with various embodiments of the present invention, the subsystem 102 is configured to provide an interactive actionable interface for optimized access and visualization of enterprise metrics and KPIs data in the form of a unified UI comprising multiple widgets. The subsystem 102 is configured to generate and deploy metrics and KPIs data widgets in a time efficient manner. The subsystem 102 is configured to provide personalizing and customizing enterprise metrics and KPIs data generation and implementation according to the end-user requirements by enabling adding and removal of the insight widgets. The subsystem 102 is configured to efficiently accumulate and identify enterprise metric and intelligently recommend metrics and KPIs data widgets. The subsystem 102 is further configured to track every click that the end-user makes on the unified UI for determining the metrics and KPIs data accessed by the end-user for understanding the end-user preferences and behavioral aspects. Further, the subsystem 102 is capable of being integrated with existing BI and visualization tools for efficiently accumulating the metrics and KPIs data for subsequent analysis and visualization. Further, the subsystem 102 is configured to provide capability to the end-users to search the metrics and KPIs data widgets quickly and efficiently by providing intelligent and predictable search functionality. Furthermore, the subsystem 102 provides cost effective and time efficient development, generation and implementation of new metrics and KPIs data.

Figure 17:
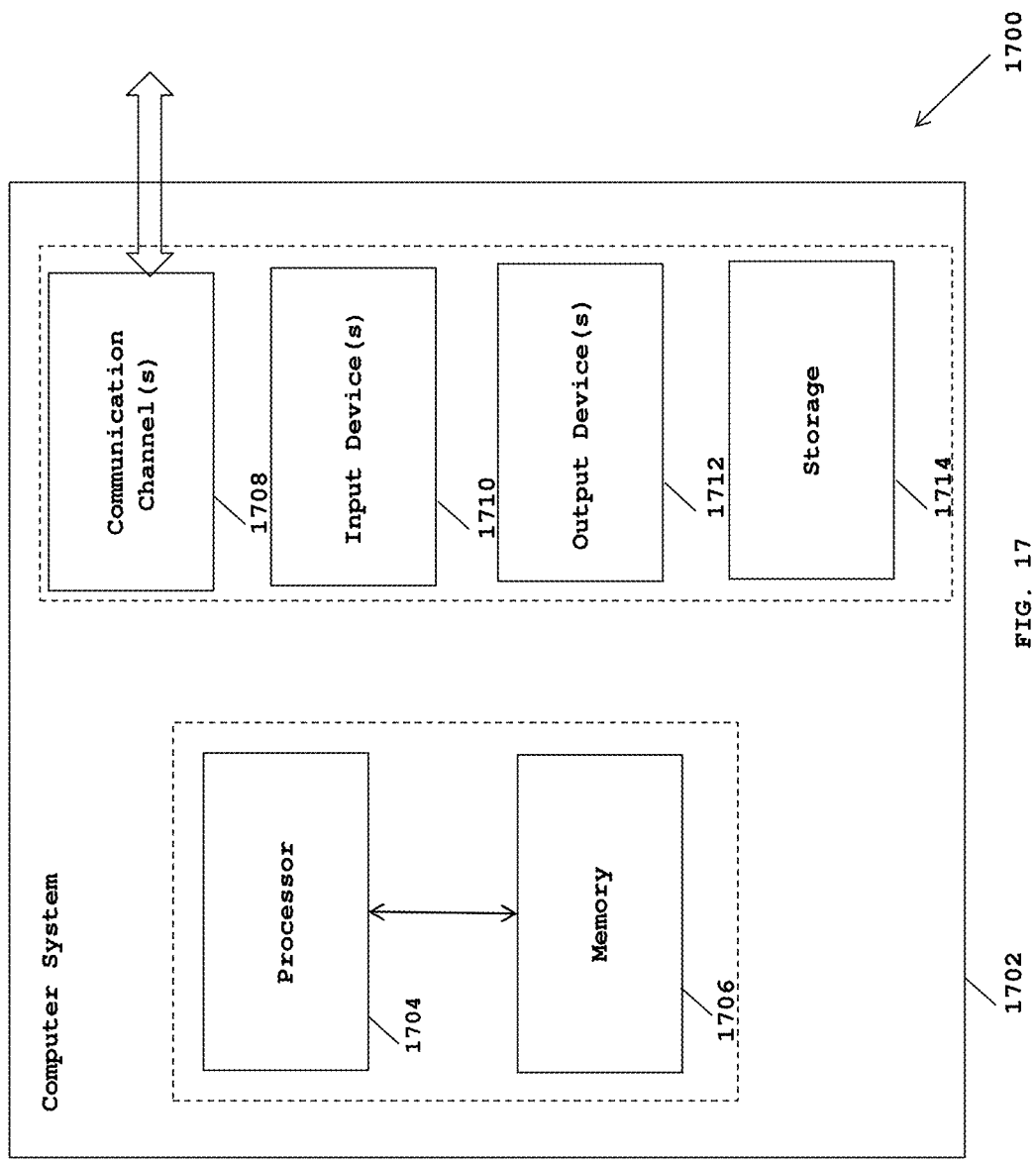
FIG. 17 illustrates an exemplary computer system in which various embodiments of the present invention may be implemented.

FIG. 17 illustrates an exemplary computer system in which various embodiments of the present invention may be implemented. The computer system 1702 comprises a processor 1704 and a memory 1706. The processor 1704 executes program instructions and is a real processor. The computer system 1702 is not intended to suggest any limitation as to scope of use or functionality of described embodiments. For example, the computer system 1702 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 1706 may store software for implementing various embodiments of the present invention. The computer system 1702 may have additional components. For example, the computer system 1702 includes one or more communication channels 1708, one or more input devices 1710, one or more output devices 1712, and storage 1714. An interconnection mechanism (not shown) such as a bus, controller, or network, interconnects the components of the computer system 1702. In various embodiments of the present invention, operating system software (not shown) provides an operating environment for various softwares executing in the computer system 1702, and manages different functionalities of the components of the computer system 1702.

The communication channel(s) 1708 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 1710 may include, but not limited to, a keyboard, mouse, pen, joystick, trackball, a voice device, a scanning device, touch screen or any another device that is capable of providing input to the computer system 1702. In an embodiment of the present invention, the input device (s) 1710 may be a sound card or similar device that accepts audio input in analog or digital form. The output device(s) 1712 may include, but not limited to, a user interface on CRT or LCD, printer, speaker, CD/DVD writer, or any other device that provides output from the computer system 1702.

The storage 1714 may include, but not limited to, magnetic disks, magnetic tapes, CD-ROMs, CD-RWs, DVDs, flash drives or any other medium which can be used to store information and can be accessed by the computer system 1702. In various embodiments of the present invention, the storage 1714 contains program instructions for implementing the described embodiments.

The present invention may suitably be embodied as a computer program product for use with the computer system 1702. The method described herein is typically implemented as a computer program product, comprising a set of program instructions which is executed by the computer system 1702 or any other similar device. The set of program instructions may be a series of computer readable codes stored on a tangible medium, such as a computer readable storage medium (storage 1714), for example, diskette, CD-ROM, ROM, flash drives or hard disk, or transmittable to the computer system 1702, via a modem or other interface device, over either a tangible medium, including but not limited to optical or analogue communications channel(s) 1708. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the scope of the invention.

I claim:

1. A system for creating an optimized actionable interface for data access and visualization, the system comprising:
    a memory storing program instructions;
    a processor executing program instructions stored in the memory;
    a visualization optimization engine executed by the processor and configured to:
        analyze different types of metrics and Key Performance Indicators (KPIs) data associated with enterprise data for determining one or more key metrics and KPIs data and identifying a causal attribution data between the key metrics and KPIs data for determining effect of change of one key metric and KPI data on another key metric and KPI data;
        generate one or more widgets based on the analyzed metrics and KPIs data, wherein the widgets represent recommendations of end-user specific metrics and KPIs data based on the end-user viewing patterns;
        generate a unified user interface (UI) for visualization of the widgets, wherein the widgets are associated with metadata corresponding to the metrics and KPIs data; and
        track an end-user activity on the unified UI based on one or more tags embedded in the unified UI, wherein the tags capture the end-user clicks and actions on the unified UI.

2. The system as claimed in claim 1, wherein the visualization optimization engine comprises an application programming interface (API) unit in a metadata utilization unit executed by the processor and configured to receive the metrics and KPIs data from a database and a models and charts data storing unit and analyze the received metrics and KPIs data for generation of the widgets and visualization of the widgets on the unified UI, the different types of metrics and KPIs data comprising a syndicated data, a business intelligence (BI) models and charts data, a non-syndicated data and data associated with various enterprise operational systems.

3. The system as claimed in claim 2, wherein the syndicated data is fetched from data warehouses, data marts, data lakes and data files associated with the database; the business intelligence (BI) models and charts data is fetched from the models and charts data storing unit; and the non-syndicated data is fetched from external and internal website systems and portals associated with the enterprise.

4. The system as claimed in claim 1, wherein the metrics and KPIs data is analyzed for determining one or more signals associated with modifications in the metrics and KPIs data, the signals are associated with a trigger for executing one or more actions, and wherein one or more pre-defined rules are applied to measure strength and consistency of the signals associated with modifications in the metrics and KPIs data.

5. The system as claimed in claim 1, wherein the recommendations comprise most viewed metrics and KPIs data widgets, relevant metrics and KPIs data widgets, new metrics and KPIs data widgets based on the end-user viewing preference and metrics and KPIs data widgets that the end-user may view based on the day and month or an event.

6. The system as claimed in claim 1, wherein the visualization optimization engine comprises an intelligent analysis unit comprising a causality unit executed by the processor and configured to provide the causal attribution data in the form of an attribution tree providing the effect of change of the one key metric and KPI data on another key metric and KPI data in isolation and conjunction.

7. The system as claimed in claim 1, wherein the visualization optimization engine comprises an intelligent analysis unit comprising an insight interlock unit executed by the processor and configured to analyze the causal attribution data between the key metrics and KPIs data for determining a causal insights data associated with the key metrics and KPIs data in the form of the one or more widgets.

8. The system as claimed in claim 1, wherein the visualization optimization engine comprises a metadata utilization unit comprising a widget catalogue unit of the executed by the processor and configured to tag the metrics and KPIs data with metadata associated with the metrics and KPI data and catalogue the metadata tagged metrics and KPIs data in the form of one or more metrics and KPIs data widgets, wherein the metadata tagged metrics and KPIs data catalogued in the widgets catalogue unit comprises a widget title, metrics and KPI's data, product name data, data quality status, published date and refreshed date.

9. The system as claimed in claim 8, wherein the metadata utilization unit comprises a metadata management unit executed by the processor and configured to store the tagged metadata in one or more structured application management tables in a database associated with the metadata management unit, the structured application management tables comprises a widget composition summary, widget metadata summary, widget connection settings and widget security.

10. The system as claimed in claim 1, wherein the unified UI comprises an intelligent search bar for carrying out predictive search, and wherein the widgets are at least added and removed on the unified UI.

11. The system as claimed in claim 1, wherein the widgets are configured to provide the one or more metrics and KPIs data in a summary view, wherein the summary view provides a visual cue for comparison against a benchmark metrics, wherein the widgets provide the summary view: as a first expanded view that provides data associated with the metrics and KPIs data in a grid of a dimension m×n, as a second expanded view of the summary view that provides causal insights data, as a third expanded view that provides more pre-defined resolution actions to be performed on the causal insights data for achieving a pre-determined goal percentage associated with the causal insights data, the pre-defined resolution actions are automatically generated by a causality unit in the visualization optimization engine and rendered on a user device via the unified interface unit for achieving the pre-determined goal percentage.

12. The system as claimed in claim 1, wherein the widgets provide information with respect to validation and testing of the metrics and KPIs data, wherein the validation and testing of the metrics and KPIs data comprises confirming whether the process to compute the metrics and KPIs data has been carried out based on one or more pre-defined guidelines and rules, the data used for computation is error free and the metrics and KPIs data displayed in the widgets is similar to the computed metrics and KPIs data.

13. The system as claimed in claim 1, wherein the visualization optimization engine comprises a unified interface unit executed by the processor and configured to: provide a predictive autocomplete text feature via an intelligent search bar of the unified UI for searching the widgets relating to the metrics and KPIs data on the unified UI and connect to a voice bot feature of a user device via a digital assistant unit in the unified interface unit for providing widgets search associated with the metrics and KPIs data based on a voice command received from the end-user.

14. The system as claimed in claim 13, wherein the unified interface unit comprises a feature set unit executed by the processor and configured to: provide one or more feature sets for customizing the unified UI to provide for locking and unlocking functionalities based on the feature sets and provide one or more options to at least search, add, arrange and remove the one or more unlocked widgets from the unified UI based on the feature sets, to provide the feature sets for personalizing the unified UI based on creating multiple pages with different metrics and KPIs data widgets on the unified UI, to generate one or more alerts for providing updates on latest trends of the key metrics and KPIs data, and to provide an option to receive feedback for the received alert.

15. The system as claimed in claim 1, wherein the metrics and KPIs data widgets are accessed and visualized on the unified UI by categorizing into at least new widgets, most viewed widgets and available widgets, and wherein the categorized widgets are added to at least a customized unified UI and the personalized unified UI.

16. The system as claimed in claim 13, wherein the unified interface unit comprises a data template unit executed by the processor and configured to generate one or more templates for developing one or more process flows on the unified UI describing events data associated with the metrics and KPIs data, the process flow is developed by sequencing widgets associated with the metrics and KPIs data in a series of events based on the events data and the developed process flow provides option for saving, sharing, collaborating and modifying the developed process flow, wherein the events data comprises at least a type of the event, cause of the event, effect of the event and steps required to minimize the effect of the event, and wherein the templates comprise web frames in which widgets are dragged and dropped for developing the process flows and the templates may be arranged in the form of the process flow.

17. The system as claimed in claim 16, wherein the data template unit renders one or more options associated with the developed process flow on the user device including the viewing sharing and favorite process flow.

18. The system as claimed in claim 1, wherein the visualization optimization unit comprises a security and tracking unit executed by the processor and configured to timestamp the end-user activity carried out on the unified UI and store the timestamped end-user activity in a content management unit of the security and tracking unit, wherein the content management unit is configured to mine the stored timestamped end-user activity for determining insights comprising most used widgets, least used widgets and frequency of usage of widgets.

19. A method for creating an optimized actionable interface for data access and visualization, wherein the method is implemented by a processor executing instructions stored in a memory, the method comprises:

analyzing different types of metrics and Key Performance Indicators (KPIs) data associated with enterprise data for determining one or more key metrics and KPIs data and identifying a causal attribution data between the key metrics and KPIs data for determining effect of change of one key metric and KPI data on another key metric and KPI data;

generating one or more widgets based on the analyzed metrics and KPIs data, wherein the widgets represent recommendations of end-user specific metrics and KPIs data based on the end-user viewing patterns;

generating a unified user interface (UI) for visualization of the widgets, wherein the widgets are associated with metadata corresponding to the metrics and KPIs data; and tracking an end-user activity on the unified UI based on one or more tags embedded in the unified UI, wherein the tags capture the end-user clicks and actions on the unified UI.

20. The method as claimed in claim 19, wherein the metrics and KPIs data is analyzed for determining one or more signals associated with modifications in the metrics and KPIs data, the signals are associated with a trigger for executing one or more actions, and wherein one or more pre-defined rules are applied to measure strength and consistency of the signals associated with modifications in the metrics and KPIs data.

21. The method as claimed in claim 19, wherein the causal attribution data is provided in the form of an attribution tree providing the effect of change of the one key metric and KPI data on another key metric and KPI data in isolation and conjunction.

22. The method as claimed in claim 19, wherein the causal attribution data is analyzed between the key metrics and KPIs data for determining a causal insights data associated with the key metrics and KPIs data in the form of the one or more widgets.

23. The method as claimed in claim 19, wherein one or more templates are generated for developing one or more process flows on the unified UI describing events data associated with the metrics and KPIs data, the process flow is developed by sequencing widgets associated with the metrics and KPIs data in a series of events based on the events data and the developed process flow provides option for saving, sharing, collaborating and modifying the developed process flow, wherein the events data comprises at least a type of the event, cause of the event, effect of the event and steps required to minimize the effect of the event, and wherein the templates comprise web frames in which widgets are dragged and dropped for developing the process flows and the templates may be arranged in the form of the process flow.

24. The method as claimed in claim 19, wherein the end-user activity carried out on the unified UI is time-stamped and the timestamped end-user activity is stored, wherein the stored timestamped end-user activity is mined for determining insights comprising most used widgets, least used widgets and frequency of usage of widgets.

25. A computer program product comprising:

a non-transitory computer-readable medium having computer-readable program code stored thereon, the computer-readable program code comprising instructions, that when executed by a processor, causes the processor to:

analyze different types of metrics and Key Performance Indicators (KPIs) data associated with enterprise data for determining one or more key metrics and KPIs data and identifying a causal attribution data between the key metrics and KPIs data for determining effect of change of one key metric and KPI data on another key metric and KPI data;

generate one or more widgets based on the analyzed metrics and KPIs data, wherein the widgets represent recommendations of end-user specific metrics and KPIs data based on the end-user viewing patterns;

generate a unified user interface (UI) for visualization of the widgets, wherein the widgets are associated with metadata corresponding to the metrics and KPIs data; and track an end-user activity on the unified UI based on one or more tags embedded in the unified UI, wherein the tags capture the end-user clicks and actions on the unified UI.

\* \* \* \* \*